(12) United States Patent
Kataoka et al.

(10) Patent No.: US 10,997,139 B2
(45) Date of Patent: May 4, 2021

(54) SEARCH APPARATUS AND SEARCH METHOD

(71) Applicant: FUJITSU LIMITED, Kawasaki (JP)

(72) Inventors: Masahiro Kataoka, Kamakura (JP); Takahide Muramoto, Zama (JP); Hitoshi Okumura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 227 days.

(21) Appl. No.: 15/911,283

(22) Filed: Mar. 5, 2018

(65) Prior Publication Data

US 2018/0276260 A1 Sep. 27, 2018

(30) Foreign Application Priority Data

Mar. 24, 2017 (JP) .............................. JP2017-060075

(51) Int. Cl.
*G06F 16/30* (2019.01)
*G06F 16/22* (2019.01)
*G06F 16/245* (2019.01)
*G06F 16/31* (2019.01)

(52) U.S. Cl.
CPC ........ *G06F 16/2237* (2019.01); *G06F 16/245* (2019.01); *G06F 16/316* (2019.01)

(58) Field of Classification Search
CPC ...... G06Q 30/02; G09B 29/007; G09B 29/10; H04W 4/029; H04W 4/024; G06F 16/24; G06F 16/29; G06F 16/2237; G06F 16/245; G06F 16/316; H04L 67/18

USPC .................................................. 715/733, 745
See application file for complete search history.

(56) References Cited

U.S. PATENT DOCUMENTS

| | | | |
|---|---|---|---|
| 2002/0095421 A1* | 7/2002 | Koskas | ................. G06F 16/284 |
| 2010/0174670 A1* | 7/2010 | Malik | ..................... G06F 16/35 706/12 |
| 2014/0046953 A1 | 2/2014 | Takuma et al. | |
| 2016/0299924 A1* | 10/2016 | Fujimoto | ................ G06F 16/22 |

FOREIGN PATENT DOCUMENTS

| | | |
|---|---|---|
| JP | 8-69476 | 3/1996 |
| JP | 2009-048352 | 3/2009 |
| JP | 2014-035760 | 2/2014 |

OTHER PUBLICATIONS

Zhang et al.: "Keyword oriented Bitmap join index for In-memory Analytical Processing", International Conference on Web-Age Information Management, 2013 (Year: 2013).*

(Continued)

*Primary Examiner* — Kuen S Lu
(74) *Attorney, Agent, or Firm* — Fujitsu Patent Center

(57) ABSTRACT

A search method includes receiving a search request to encoded text data, based on first index information produced by specifying an occurrence position of a character or a word included in original data of the encoded text data as a first axis and contents of the search request, generating second index information having a second axis superordinate to the first axis, and searching the encoded text data in response to the search request using the second index information.

13 Claims, 24 Drawing Sheets

(56) References Cited

OTHER PUBLICATIONS

Seji Okura et al., "Reuse of Compressed Language Analysis Data by Combination of Word Entropy Coding and Semantic Structure Coding with Compression Ratios Exceeding Those of ZIP", The Twenty-first Annual Meeting of the Association for Natural Language Processing, Japan, The Association for Natural Language Processing, Mar. 9, 2015, Partial Translation:pp. 1, 2. Background Techniques—2.1.Character Coding Techniques and Issues Thereof.
JPOA—Office Action of Japanese Patent Application No. 2017-060075 dated Oct. 20, 2020 with Machine Translation.

* cited by examiner

FIG. 5A

SEARCH QUERY: "in front of"

BITMAP TYPE
INDEX BI front
in
of in (BASIC) 63··· 35 34 33 32 31 30 29 28 27 26 25 24 23 22 21 20 19 18 17 16 15 14 13 12 11 10 9 8 7 6 5 4 3 2 1 0
0 0 0 0 | 0 0 0 0 | 0 0 0 0 | 0 0 0 0 | 0 0 0 0 | 0 0 0 0 | 0 0 0 0 | 0 1 0 0 | 0 0 0 0 | 0 0 0 0
s1 in (上位) 31 30 29 28 27 26 25 24 23 22 21 20 19 18 17 16 15 14 13 12 11 10 9 8 7 6 5 4 3 2 1 0
0 0 0 0 | 0 0 0 0 | 0 0 0 0 | 0 0 0 0 | 0 0 0 0 | 0 0 0 0 | 0 0 0 0 | 0 0 0 0 | 0 0 0 1 in (BASIC) 127··· 99 98 97 96 95 94 93 92 91 90 89 88 87 86 85 84 83 82 81 80 79 78 77 76 75 74 73 72 71 70 69 68 67 66 65 64
0 0 0 0 | 0 0 0 0 | 0 0 0 0 | 0 0 0 0 | 0 0 0 0 | 0 0 0 0 | 0 0 0 0 | 0 1 0 0 | 0 0 0 0
s2 in (UPPER LEVEL) 31 30 29 28 27 26 25 24 23 22 21 20 19 18 17 16 15 14 13 12 11 10 9 8 7 6 5 4 3 2 1 0
0 0 0 0 | 0 0 0 0 | 0 0 0 0 | 0 0 0 0 | 0 0 0 0 | 0 0 0 0 | 1 0 0 0 | 0 0 0 0 | 0 0 1 1

SEARCH APPARATUS AND SEARCH METHOD

CROSS-REFERENCE TO RELATED APPLICATION

This application is based upon and claims the benefit of priority of the prior Japanese Patent Application No. 2017-60075, filed on Mar. 24, 2017, the entire contents of which are incorporated herein by reference.

FIELD

The embodiments discussed herein are related to search techniques.

BACKGROUND

Techniques for generating an index that indicates the presence or absence of each character or word in each file and using the index for searches are known.

Also, techniques are known that search a plurality of documents for an intended document based on a search condition using multi-stage layered indexes. In those techniques, a search apparatus obtains a search condition, and obtains bitmap tables from the uppermost stage to the lowermost stage in sequence based on the search condition from the multi-stage layered indexes in which hierarchically formed bitmap tables are layered in multiple stages. The search apparatus then extracts a bitmap string corresponding to the search condition from the obtained bitmap tables and performs a bit-wise operation so as to calculate a bitmap. A bit-wise operation refers to calculating a logical product when the search condition is an "AND search", and calculating a logical add when the search condition is an "OR search". The search apparatus then extracts a document corresponding to the position to which a bit is assigned in the bitmap calculated in the lowermost stage from a plurality of documents.

For example, the related techniques are disclosed in Japanese Laid-open Patent Publication Nos. 2009-048352 and 2014-035760.

SUMMARY

According to an aspect of the invention, a search method includes receiving a search request to encoded text data, based on first index information produced by specifying an occurrence position of a character or a word included in original data of the encoded text data as a first axis and contents of the search request, generating second index information having a second axis superordinate to the first axis, and searching the encoded text data in response to the search request using the second index information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a diagram (1) illustrating an example of the flow of the search processing according to the first embodiment;

DESCRIPTION OF EMBODIMENTS

There is a problem in that it is difficult to search document data for a word string or a character string indicated by a search condition at a high speed by the related-art.

For example, by the first related art in which a search is carried out using an index that indicates the presence or absence of each of a character or a word in each file, it is possible to search which file contains each word (or each character) included in a word string (or a character string). However, a word string (or a character string) that indicates a search condition is normally a string of consecutive words. In this case, when a search apparatus makes a search for a word (or a character) included in a word string (or a character string) that are indicated the search condition including the sequence, the search apparatus has to verify whether or not the position of each word (or each character) included in the search condition is consecutive once again. Accordingly, by the first technique, it is difficult to search document data for a word string or a character string that is indicated by a search condition at a high speed.

Figure 1:
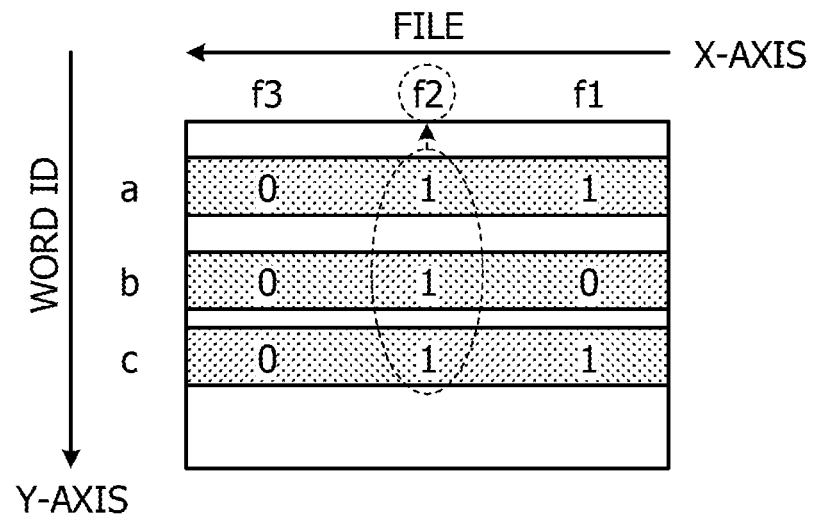
FIG. 1 is a schematic diagram illustrating a reference example of search processing.

Here, a description will be given of the problem in that it is difficult to search for a word string that is indicated by a search condition at a high speed using the first related art with reference to FIG. 1. FIG. 1 is a schematic diagram illustrating a reference example of search processing. As illustrated in FIG. 1, it is assumed that an index that indicates the presence or absence of each file by a bit value is generated for each word ID indicated by a word. It is then possible for the search processing to search that each word included in a word string "abc" exists in a file f2 when a search request is the word string "abc". However, it is not possible for the search processing to search for the sequence of each word in the file f2. In order for the search processing to search for the word string "abc" including the sequence of the words, for example, the search processing has to verify the sequence once again by referring to the file f2. Accordingly, by the first technique, it is difficult to search for a word string or a character string that is indicated by a search condition at a high speed from document data.

Also, by the second related art that makes a search using multi-stage layered indexes, it is possible for a search apparatus to search for a target document based on a search condition. However, when a search condition is a word string, in order for the search apparatus to make a search for a word included in a word string that are indicated the search condition including the sequence, the search apparatus has to verify whether or not the position of each word included in the search condition is consecutive once again. Accordingly, by the second related art, it is difficult to search for a word string or a character string that is indicated by a search condition at a high speed from document data In the following, a detailed description will be given of a search program, an information processing apparatus, and a search method according to embodiments of the present disclosure with reference to the drawings. In this regard, this disclosure is not limited by the embodiments.

First Embodiment

Search Processing According to First Embodiment

Figure 2:
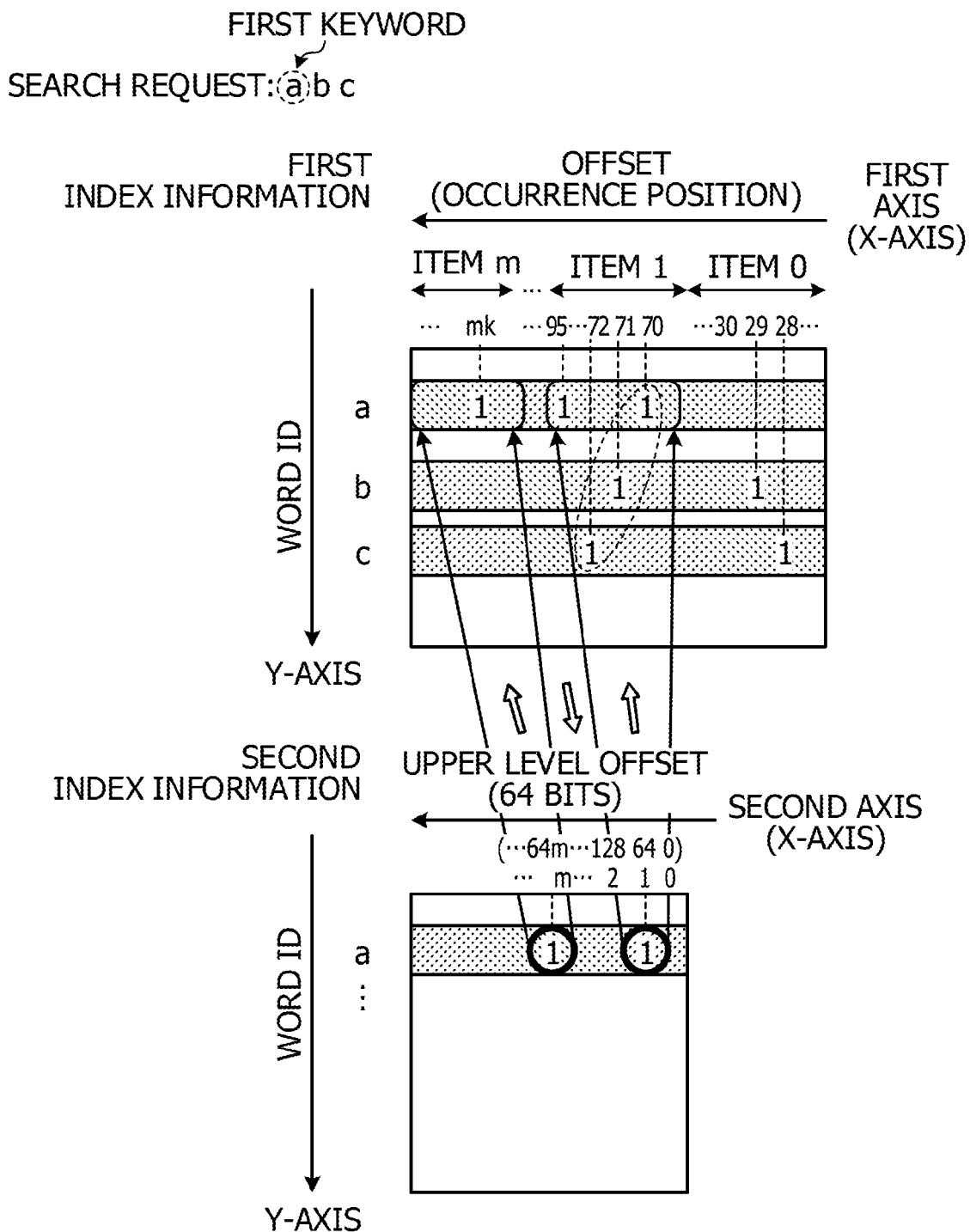
FIG. 2 is a schematic diagram illustrating search processing according to a first embodiment.

FIG. 2 is a schematic diagram illustrating search processing according to a first embodiment. As illustrated in FIG. 2, in the search processing, a search request to the encoded data is received. The content of a search request is, for example, a character string or a word string. In the search processing, the following processing is then performed based on the first index information having the occurrence position in the original data of a character or a word in the encoded data as a first axis and the contents of the search condition. That is to say, the search processing generates second index information having a second axis which is superordinate to the first axis of the first index information. The second axis is an axis for superordinating (aggregating) a bit string for each item of the first axis into each one bit. An item mentioned here refers to a separation unit of the original data of the encoded data, and corresponds to, for example, a register capacity of 64 bits, 128 bits, or the like. In the first embodiment, a description will be given on the assumption that an item corresponds to the register capacity of 64 bits. The second index information mentioned here is generated, for example, for the first keyword of the search request. The first keyword mentioned here refers to, for example, a first keyword (character or word) of the contents of the search request. In the search processing, a search is then performed on the encoded text data in response to the search request using the second index information.

Here, it is assumed that a word string "abc" has been received as a search request. Also, in the first index information, the occurrence position of the original data of the encoded text data is set to "1" as the occurrence bit for the word ID indicated by a word. As an example, for the word ID of the word "a", the occurrence positions "70", "95", and "$m_k$", and the like of the original data of the encoded text data are set to "1" as the occurrence bit. For the word ID of the word "b", the occurrence position "71", or the like of the original data of the encoded text data is set to "1". For the word ID of the word "c", the occurrence position "72" is set to "1", or the like as the occurrence bit.

In the search processing, second index information having the second axis superordinate to the first axis of the first index information is generated based on the first index information and the contents of the search request. Here, in the search processing, second index information having a second axis produced by superordinating (aggregating) a bit string for each item (64 bits) of the first axis of the first index information into one bit is generated for the first keyword "a" of the search request. As an example, in the search processing, since any one bit corresponding to the item 1 (the 64th bit to the 127th bit) is set to "1" for the first keyword "a", the occurrence position "1" corresponding to the item 1 of the second index information is set to "1" as the occurrence bit. Here, the item 1 of the first axis of the first index information indicates a bit string from the 64th bit to the 127th bit. The occurrence position corresponding to the item 1 of the second axis of the second index information indicates the bit position corresponding to the 64 bits. The bit position corresponding to the 64 bits may be the first bit or the 64th bit. In the search processing, any one bit corresponding to an item m (the 64m-th bit to the (64m+63)-th bit) for the first keyword "a" is set as "1", the occurrence position "m" corresponding to the item m of the second index information is set to "1" as the occurrence bit. Here, the item m of the first axis of the first index information indicates a bit string from the 64m-th bit to the (64m+63)-th bit. The occurrence position corresponding to item m of the second axis of the second index information indicates the bit position corresponding to the 64m-th bit. The bit position corresponding to the 64m-th bit may be the m-th bit or the 64m-th bit.

In the search processing, a search is made on the encoded text data corresponding to the search request using the second index information. Here, in the search processing, the occurrence position (item No) which is set to "1" for the first keyword "a" of the search request is obtained using the second index information. The obtained occurrence positions (item Nos) are "1" and "m". In the search processing, an area corresponding to the item No from the first index information is extracted, and a word string "abc" indicated by the search request is searched from the extracted area. As an example, in the area corresponding to the item 1, the occurrence position "70" is set to the occurrence bit of the word "a", the occurrence position "71" is set to the occurrence bit of the word "b", and the occurrence position "72" is set to the occurrence bit of the word "c". Accordingly, the word string "abc" indicated by the search request is searched in the area corresponding to the item 1. On the other hand, in the area corresponding to the item m, the occurrence position "$m_k$" is set to the occurrence bit of the word a, but the occurrence position "$m_k+1$" is not set to the occurrence bit of the word b. Accordingly, the word string "abc" indicated by the search request is not found in the area corresponding to the item m.

In this manner, in the search processing, the search area is narrowed down by the upper-level hierarchy index information so that it is possible to search for a word string or a character string that is indicated by the search request from the encoded text data at a high speed.

Encoding Processing According to First Embodiment

Figure 3:
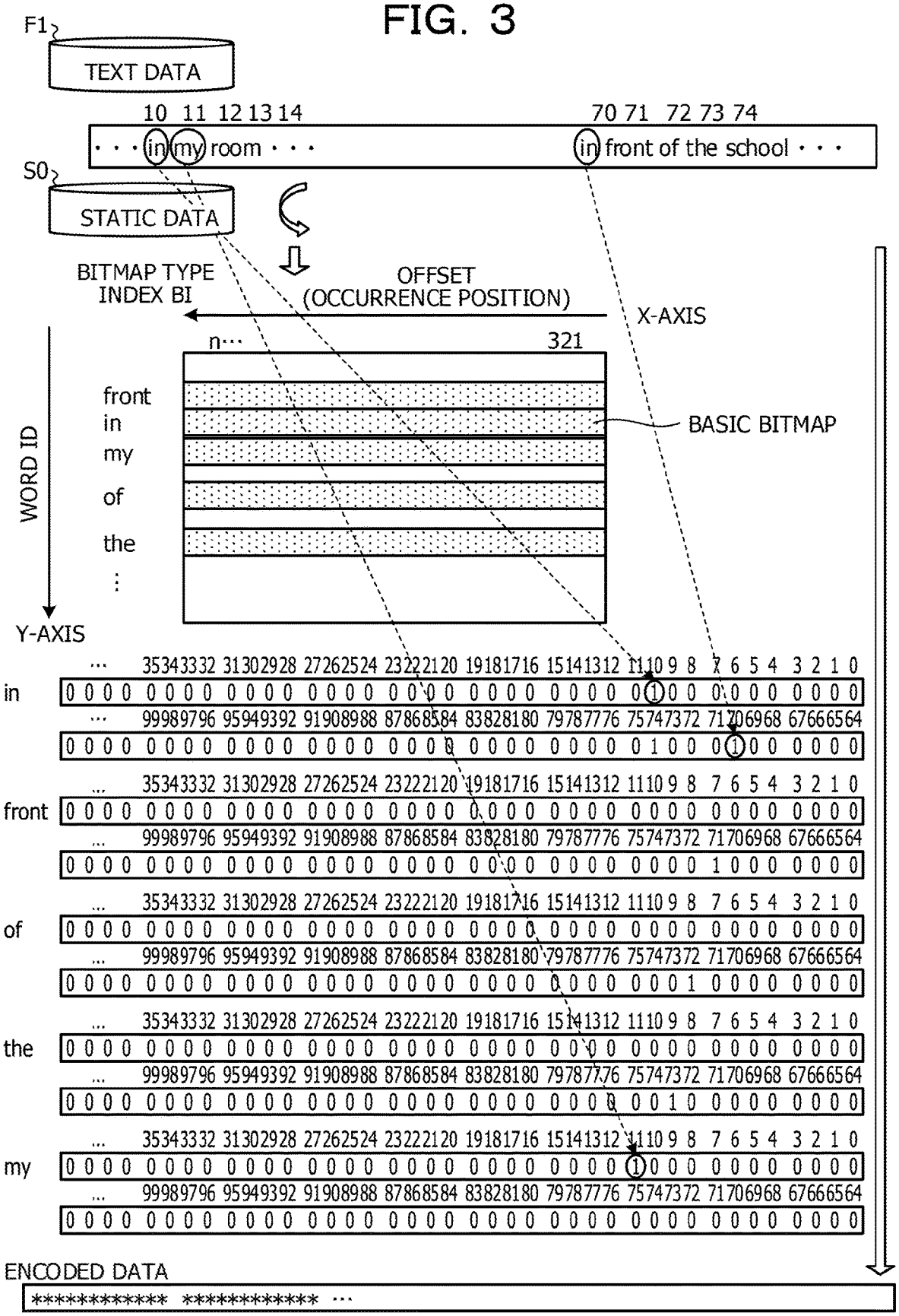
FIG. 3 is a diagram illustrating an example of the flow of encoding processing according to the first embodiment.

FIG. 3 is a diagram illustrating an example of the flow of encoding processing according to the first embodiment. As illustrated in FIG. 3, in the encoding processing, a character or a word included in text data F1 of the encoding target is encoded in sequence using a static dictionary S0, and the encoded code is output to the encoded data. In the encoding processing, first index information having the occurrence position of a character or a word in the text data F1 as a first axis is generated.

The static dictionary S0 mentioned here is a dictionary in which the occurrence frequency of a word that occurs in a document is identified based on English dictionaries, Japanese dictionaries, school textbooks, and the like in general, and a word having a higher occurrence frequency is given a shorter code. In the static dictionary S0, a static code, which is a code corresponding to each word, is recorded in advance.

The first index information mentioned here refers to a "bitmap type index" and is denoted by a sign BI. A character mentioned here is, for example, a CJK character. A word mentioned here refers to, for example, an English word. In this regard, in the following, a description will be given of the case where the text data F1 is formed by words. However, the present embodiment is not limited to this, and the text data F1 may be formed by characters.

Here, a description will be given of the bitmap type index BI. The bitmap type index BI includes a pointer that specifies a word included in the text data F1 of the encoding target and a bit string that links a bit indicating the presence or absence of a word at an offset (occurrence position) in the text data F1. That is to say, the bitmap type index BI refers to a bitmap that indexes the presence or absence of a word included in the text data F1 of the encoding target for each offset (occurrence position). As an example, if a word exists at a certain occurrence position in the text data F1, the occurrence position is set to ON as the presence or absence of an offset (occurrence position) corresponding to the occurrence position, for example, is set to a binary number "1" as the occurrence bit. If a word does not exist at a certain occurrence position in the text data, the occurrence position is set to OFF as the presence or absence of an offset (occurrence position) corresponding to the occurrence position, for example, is set to a binary number "0". As a pointer that specifies a word, for example, the word ID of a word is employed. The word ID may be the word itself or may be a sign of the word. The sign of a word refers to an encoded code and, as an example, corresponds to a static code.

For example, as illustrated in FIG. 3, the X-axis of the bitmap type index BI represents an offset (occurrence position), and the Y-axis represents a word ID. That is to say, each bitmap included in the bitmap type index BI represents the presence or absence of a word denoted by the word ID for each offset (occurrence position). In this regard, it is assumed that each bitmap included in the bitmap type index BI may also be referred to as a "basic bitmap".

Here, a word "in" occurs at the 10th position in the text data F1 of the encoding target, and thus the occurrence position of the 10th bit in the basic bitmap corresponding to the word "in" is set to ON, that is to say, is set to the occurrence bit denoted by the binary number of "1". A word "my" occurs at the 11th position in the text data F1 of the encoding target, and thus the occurrence position of the first bit of the basic bitmap corresponding to the word "my" is set to ON, that is to say, is set to the occurrence bit denoted by the binary number of "1". The word "in" occurs at the 70th position in the text data F1 of the encoding target, and thus the occurrence position of the 70th bit in the basic bitmap corresponding to the word "in" is set to ON, that is to say, is set to the occurrence bit denoted by the binary number of "1". In this regard, each time a word in the text data F1 is encoded, the occurrence position of the basic bitmap corresponding to the word is set to the occurrence bit in the bitmap type index BI.

Example of Structure of Encoded File

Figure 4:
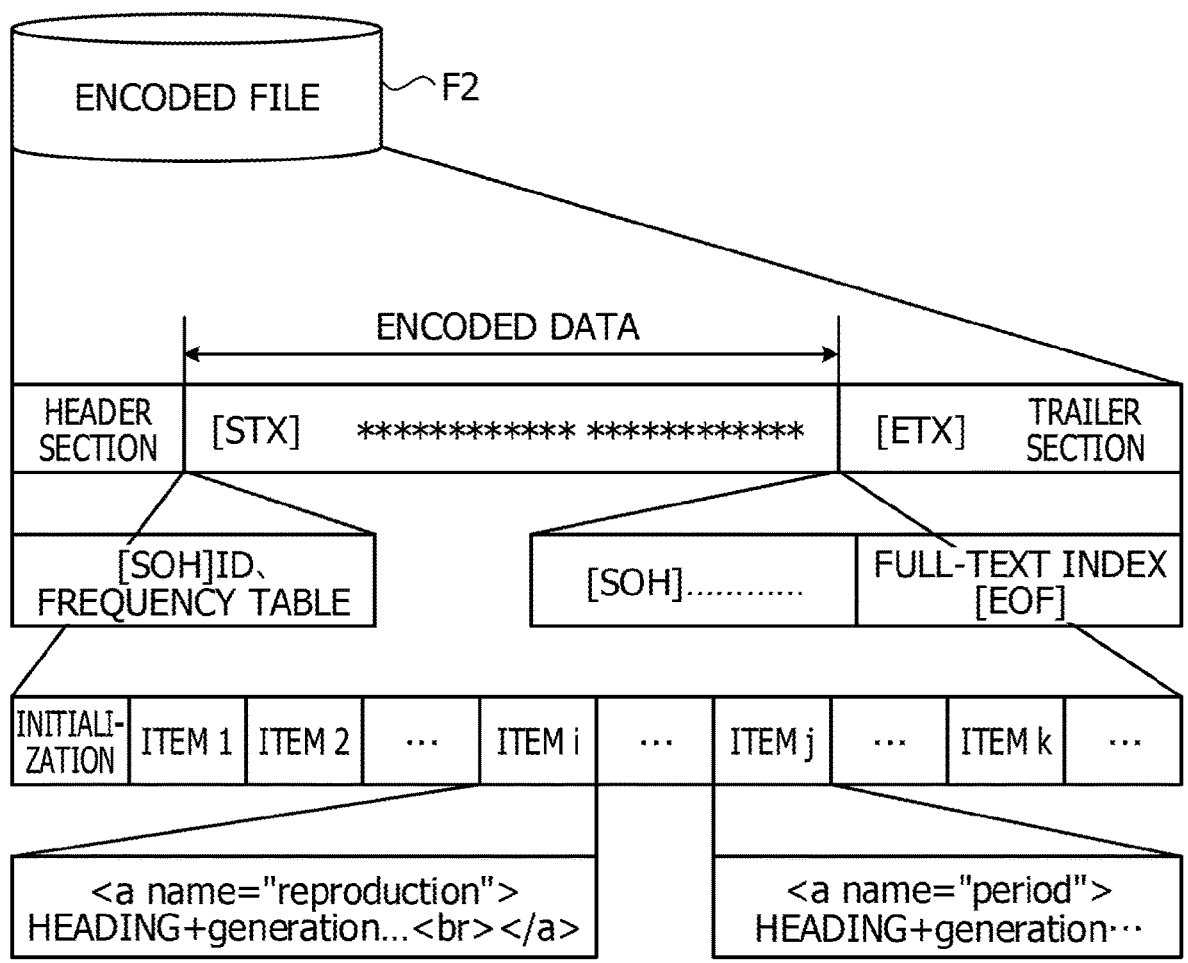
FIG. 4 is a diagram illustrating an example of the structure of an encoded file according to the first embodiment.

FIG. 4 is a diagram illustrating an example of the structure of an encoded file according to the first embodiment. As illustrated in FIG. 4, an encoded file F2 includes a header section, encoded data, and a trailer section. The encoded data stores an encoded code group produced by encoding the text data F1. The trailer section stores information after the completion of the encoding processing, the bitmap type index BI, and the like. The header section stores information, for example, information for identifying an encoding algorithm used for generating the encoded file F2, parameters used for encoding, and the like, and, for example, a pointer to each information stored in the trailer section, and the like.

Search Processing According to First Embodiment

Figure 5B:
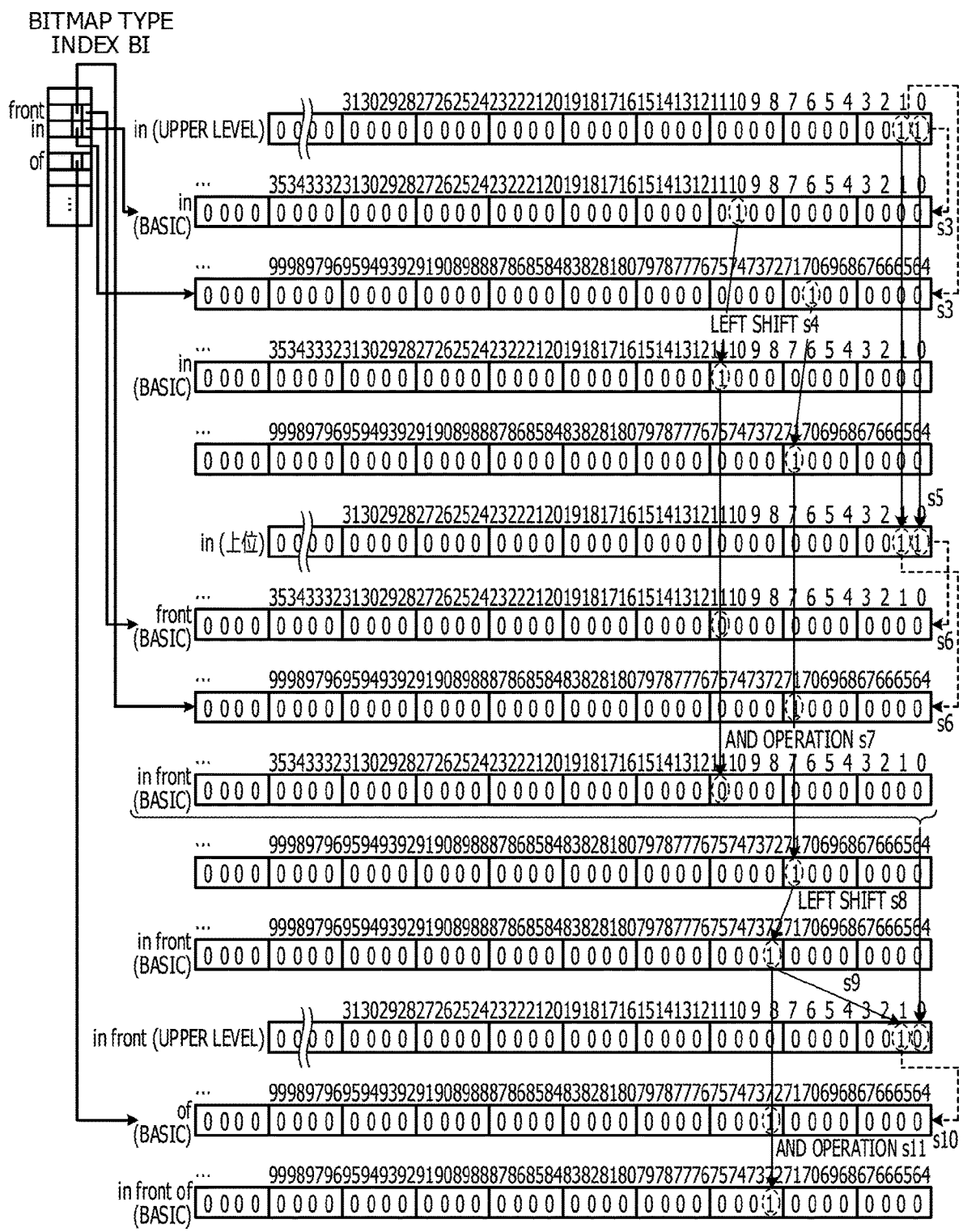
FIG. 5B is a diagram (2) illustrating an example of the flow of the search processing according to the first embodiment.

FIG. 5A and FIG. 5B are diagrams illustrating an example of the flow of the search processing according to the first embodiment. As illustrated in FIG. 5A and FIG. 5B, in the search processing, the following processing is performed based on the bitmap type index BI having the occurrence position of a character or a word in the text data F1, which is the original data of the encoded data, as the first axis and the contents of a search query. That is to say, in the search processing, an upper-level hierarchy bitmap having a second axis which is superordinate to the first axis of the bitmap type index BI is generated for the first keyword of the search query. The second axis is an axis that is produced by superordinating (aggregating) a bit string for each 64 bits of the first axis into one bit. The first keyword is a first keyword (word) of the search query. In the search processing, a search is made of the encoded data corresponding to the search query using the upper-level hierarchy bitmap for the first keyword.

As illustrated in FIG. 5A, in the search processing, a search query on the encoded data is received. Here, the content of the search query is a word string "in front of".

In the search processing, an upper-level hierarchy bitmap for the first keyword of the word string indicated by the search query is generated by referring to the bitmap type index BI.

For example, in the search processing, a first 64-bit section in the basic bitmap for the first keyword is extracted from the bitmap type index BI. In the search processing, if any bit in the extracted first 64-bit section is set as the occurrence bit, a first 64-bit section of the upper-level hierarchy bitmap for the first keyword is then generated. That is to say, in the search processing, the occurrence position of the 0th bit of the upper-level hierarchy bitmap for the first keyword is set to the occurrence bit of "1" (s1). Here, the first keyword is "in". The 10th bit in the first 64-bit section of the basic bitmap for "in" is set as the occurrence bit of "1", so that the 0th bit of the upper-level hierarchy bitmap for "in" is set to "1". In this regard, in the search processing, if any bit of the extracted first 64-bit section is not set as the occurrence bit, the occurrence position of the 0th bit of the upper-level hierarchy bitmap for the first keyword is set to "0".

Next, in the search processing, the second 64-bit section in the basic bitmap for the first keyword is extracted from the bitmap type index BI. In the search processing, if any bit in the extracted second 64-bit section is set as the occurrence bit, the second 64-bit section of the upper-level hierarchy bitmap for the first keyword is generated. That is to say, in the search processing, the occurrence position of the first bit of the upper-level hierarchy bitmap for the first keyword is set to the occurrence bit of "1" (s2). Here, the 70th bit of the second 64-bit section in the basic bitmap for "in" is set as the occurrence bit of "1", and thus the first bit of the upper-level hierarchy bitmap for "in" is set to the occurrence bit of "1". In this regard, in the search processing, if any bit in the extracted second 64-bit section is not set as the occurrence bit, the occurrence position of the first bit of the upper-level hierarchy bitmap for the first keyword is set to "0".

In this manner, in the search processing, a 64-bit section of the upper-level hierarchy bitmap for the first keyword is generated until there are no 64-bit sections in the basic bitmap for the first keyword.

As illustrated in FIG. 5B, in the search processing, the upper-level hierarchy bitmap for the first keyword is referenced, and the occurrence position of the occurrence bit is obtained. In the search processing, a target section of the basic bitmap for the first keyword corresponding to the obtained occurrence position is extracted from the bitmap type index BI (s3). Here, the "0"-th bit of the upper-level hierarchy bitmap for the first keyword "in" is set as "1", and thus the first 64-bit section in the basic bitmap for "in", which is the 64-bit section corresponding to the "0"-th bit, is extracted. Also, the "first" bit of the upper-level hierarchy bitmap for the first keyword "in" is set as "1", and thus the second 64-bit section in the basic bitmap for "in", which is the 64-bit section corresponding to the "first" bit, is extracted.

In the search processing, each target section is then left shifted by one bit for each extracted target section (s4). Here, the 11th bit of the first 64-bit section is set to "1". Also, the 71st bit of the second 64-bit section is set to "1".

In the search processing, the upper-level hierarchy bitmap for the first keyword is corrected (s5). This is because if an overflow occurs by the left shifting the target section, this situation has to be handled. That is to say, if the most significant bit of the target section is set as "1", an overflow occurs by left shifting the target section. At this time, the occurrence position of the upper-level hierarchy bitmap which has not been set as "1" by the overflow, and the occurrence position of the upper-level hierarchy bitmap for the occurrence position is newly set to "1" are corrected. Here, an overflow does not occur by left shifting the target section, and thus the upper-level hierarchy bitmap for "in" is not corrected.

In the search processing, the upper-level hierarchy bitmap for the first keyword is referenced, and the occurrence position of the occurrence bit is obtained. In the search processing, the target section of the basic bitmap for the next keyword of the search query corresponding to the occurrence position obtained from the bitmap type index BI is extracted (s6). Here, the next keyword of the search query is "front". The "0"-th bit of the upper-level hierarchy bitmap for "in" is set as "1", and thus the first 64-bit section in the basic bitmap for "front", which corresponds to a 64-bit section corresponding to the "0"-th bit, is extracted. Also, the "first" bit of the upper-level hierarchy bitmap for "in" is set as "1", and thus the second 64-bit section in the basic bitmap for "front", which is a 64-bit section corresponding to the "first" bit, is extracted.

In the search processing, an AND operation is performed between the basic bitmap for the first keyword and the basic bitmap for the next keyword in the search query for each extracted target section (s7). Here, in the search processing, an AND operation is performed between the basic bitmap for "in" and the basic bitmap for the next keyword "front" in the search query for the first 64-bit section. The result of the AND operation is the first 64-bit section in the basic bitmap for "in front". In the first 64-bit section in the basic bitmap for "in front", all the bits are "0". Also, in the search processing, an AND operation is performed between the basic bitmap for "in" and the basic bitmap for the next keyword "front" in the search query for the second 64-bit section. The result of the AND operation is the second 64-bit section in the basic bitmap for "in front". In the second 64-bit section in the basic bitmap for "in front", the 71st bit is "1".

In the search processing, a determination is made as to whether or not there is a target section any one bit of which indicates "1" among the target sections having been subjected to the AND operation. Here, the target sections having been subjected to the AND operation are the first 64-bit section and the second 64-bit section in the basic bitmap for "in front". In the first 64-bit section, all the bits are "0". In the second 64-bit section, the 71st bit is "1". Accordingly, in the search processing, a determination is made that there is a second 64-bit section as the target section any one bit of which indicates "1".

In the search processing, the target section any one bit of which indicates "1" is left shifted by one bit among the target sections having been subjected to the AND operation (s8). Here, in the search processing, the second 64-bit section in the basic bitmap for "in front" is left shifted by one bit. In the second 64-bit section in the basic bitmap for "in front", the 72nd bit is set to "1".

In the search processing, the upper-level hierarchy bitmap for the word string of the first keyword and the next keyword is corrected (s9). This is because the situation has to be handled in the case where an overflow occurs by left shifting the target section. That is to say, if the most significant bit of the target section is "1", an overflow occurs by left shifting the target section. At this time, the occurrence position of the upper-level hierarchy bitmap for the occurrence position of the bit which has not been set to "1" by the overflow and the occurrence position of the upper-level hierarchy bitmap for the occurrence position of the bit which is newly set to "1"

are corrected. Here, since an overflow does not occur by left shifting the target section, the upper-level hierarchy bitmap for "in front" is not corrected.

In the search processing, the upper-level hierarchy bitmap for the word string of the first keyword and the next keyword is referenced, and the occurrence position of the occurrence bit is obtained. In the search processing, the target section of the basic bitmap for the next keyword of the search query, which corresponds to the obtained occurrence position, is further extracted from the bitmap type index BI (s10). Here, the further next keyword of the search query is "of". The "first" bit of the upper-level hierarchy bitmap for "in front" is set as "1", and thus the second 64-bit section, which is a 64-bit section corresponding to the "first" bit, in the basic bitmap for "of" is extracted.

In the search processing, an AND operation is performed between the basic bitmap for the word string of the first keyword and the next keyword, and the basic bitmap for the further next keyword of the search query for each extracted target section (s11). Here, in the search processing, an AND operation is performed between the basic bitmap for "in front" and the basic bitmap for the further next keyword "of" of the search query for the second 64-bit section. The result of the AND operation is the second 64-bit section of the basic bitmap for "in front of". In the second 64-bit section of the basic bitmap for "in front of", the 72nd bit is "1".

In the search processing, a determination is made as to whether or not there is a target section any bit of which indicates "1" among the target sections having been subjected to the AND operation. Here, the target section having been subjected to the AND operation is the second 64-bit section in the basic bitmap for "in front of". In the second 64-bit section, the 72nd-bit is "1". Accordingly, in the search processing, a determination is made that the second 64-bit section exists as a target section any bit of which indicates "1". That is to say, in the search processing, a statement that the search query "in front of" exists is output as a search result. In this regard, in the search processing, the search query exists at which occurrence position of which 64-bit section may be output as a search result. Here, in the search processing, the existence of "in front of" at the 72nd-bit of the second 64-bit section may be output as a search result.

Configuration of Information Processing Apparatus According to First Embodiment

Figure 6:
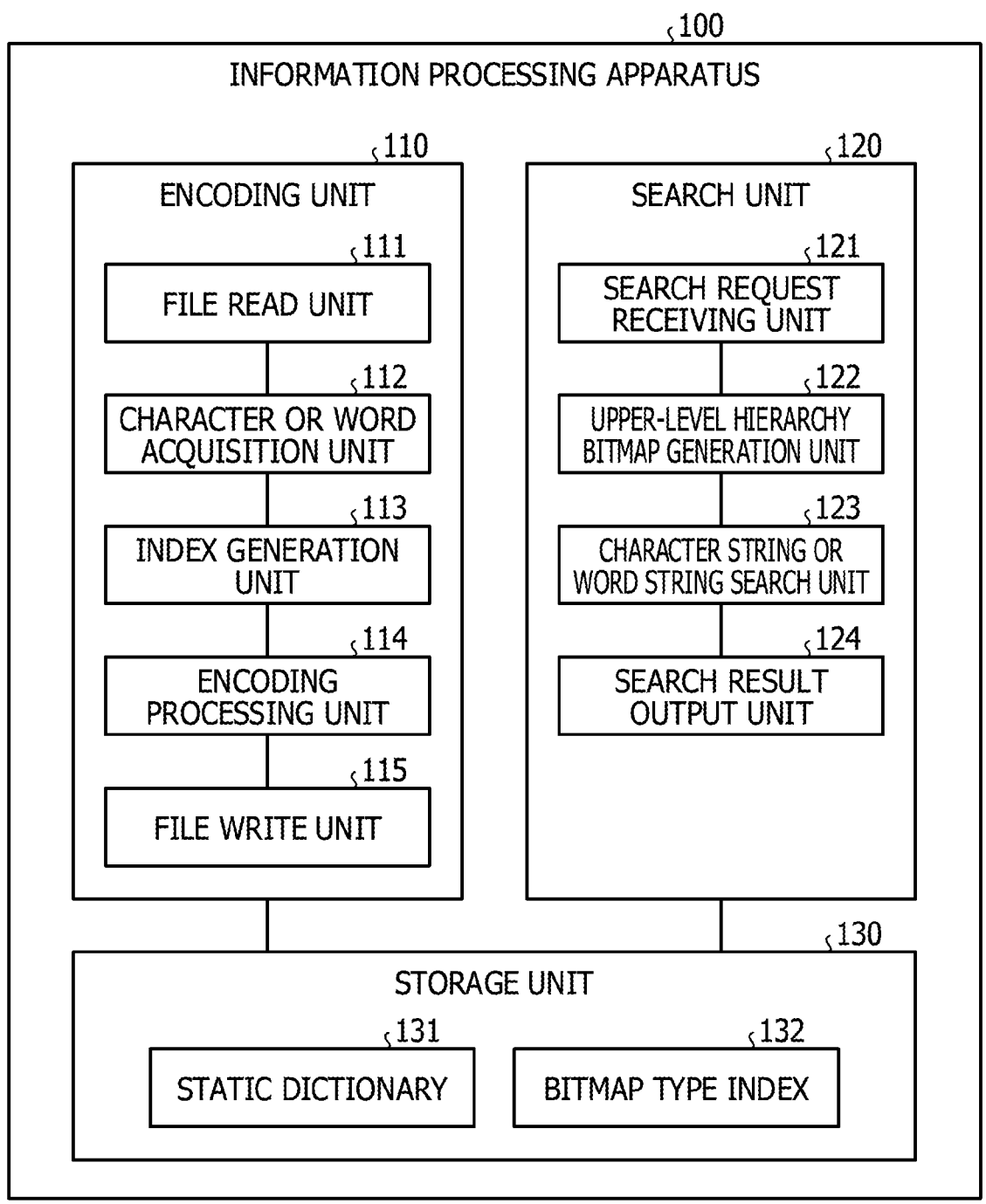
FIG. 6 is a functional block diagram illustrating an example of the configuration of an information processing apparatus according to the first embodiment.

FIG. 6 is a functional block diagram illustrating an example of the configuration of an information processing apparatus according to the first embodiment. As illustrated in FIG. 6, an information processing apparatus 100 includes an encoding unit 110, a search unit 120, and a storage unit 130.

The encoding unit 110 is a processing unit that performs the encoding processing illustrated in FIG. 3. The encoding unit 110 includes a file read unit 111, a character or word acquisition unit 112, an index generation unit 113, an encoding processing unit 114, and a file write unit 115.

The search unit 120 is a processing unit that performs the search processing illustrated in FIG. 5A and FIG. 5B. The search unit 120 includes a search request reception unit 121, an upper-level hierarchy bitmap generation unit 122, a character string or word string search unit 123, and a search result output unit 124. The search request reception unit 121 is an example of the search unit. The upper-level hierarchy bitmap generation unit 122 is an example of the generation unit. The character string or word string search unit 123 is an example of the search unit.

The storage unit 130 corresponds to a storage device, such as a nonvolatile semiconductor memory element, or the like, for example, a flash memory, Ferroelectric Random Access Memory (FRAM (registered trademark)), or the like. The storage unit 130 includes a static dictionary 131 and a bitmap type index 132.

The static dictionary 131 is a dictionary in which the occurrence frequency of a word that occurs in the text data F1 is identified based on English dictionaries, Japanese dictionaries, school textbooks, and the like in general, and a word having a higher occurrence frequency is given a shorter code. In the static dictionary 131, a static code, which is a code corresponding to each character or word, is recorded in advance. In this regard, the static dictionary 131 corresponds to the static dictionary S0.

The bitmap type index 132 is a set of basic bitmaps produced by indexing the presence or absence of a word or a character included in the text data F1 for each offset (occurrence position). In this regard, the bitmap type index 132 corresponds to the bitmap type index BI. The description of the bitmap type index 132 is the same as that for FIG. 3, and thus the description thereof will be omitted.

The file read unit 111 reads the text data F1 of the encoding target to a storage area.

The character or word acquisition unit 112 obtains a character or a word from the text data F1. For example, the character or word acquisition unit 112 performs lexical analysis on the text data F1 read in the storage area. The character or word acquisition unit 112 obtains a character or a word of the lexical analysis result in sequence from the beginning. The character or word acquisition unit 112 associates the obtained characters or words with the respective occurrence positions in the text data F1 and outputs them in the index generation unit 113. The character or word acquisition unit 112 outputs the obtained characters or words to the encoding processing unit 114.

The index generation unit 113 generates the bitmap type index 132. For example, the index generation unit 113 extracts a basic bitmap corresponding to the character for each character output from the character or word acquisition unit 112 from the bitmap type index 132. The index generation unit 113 sets a bit corresponding to the occurrence position in the text data F1 to the occurrence bit in the extracted basic bitmap. Also, the index generation unit 113 extracts a basic bitmap corresponding to the word from the bitmap type index 132 for each word output from the character or word acquisition unit 112. The index generation unit 113 sets a bit corresponding to the occurrence position in the text data F1 to the occurrence bit in the extracted basic bitmap.

The encoding processing unit 114 encodes a character or a word. For example, the encoding processing unit 114 encodes the character output from the character or word acquisition unit 112 to static code recorded in the static dictionary 131. Also, the encoding processing unit 114 encodes the word output from the character or word acquisition unit 112 to static code recorded in the static dictionary 131.

The file write unit 115 stores the encoded code produced by encoding by the encoding processing unit 114 in the encoded data of the encoded file F2. The file write unit 115 writes the bitmap type index 132 in the trailer section of the encoded file F2.

The search request reception unit 121 receives a search request for the encoded data. For example, the search request receiving unit 121 receives a character string of a search target or a word string of a search target as a search request. In this regard, a search query is an example of the search request. The search request reception unit 121 may receive a word string in which characters and words are mixed as a search request.

The upper-level hierarchy bitmap generation unit 122 generates an upper-level hierarchy bitmap having a second axis which is superordinate to the first axis based on the bitmap type index 132 and the contents of the search request. In this regard, the second axis is an axis produced by superordinating (aggregating) a bit string for each 64 bits of the first axis into one bit. For example, the upper-level hierarchy bitmap generation unit 122 extracts the n-th 64-bit section in the basic bitmap for the first keyword of the search request from the bitmap type index 132. In this regard, n is a natural number of 1 or more. If any bit of the extracted n-th 64-bit section is set as the occurrence bit, the upper-level hierarchy bitmap generation unit 122 sets the bit produced by aggregating the n-th 64-bit section of the upper-level hierarchy bitmap for the first keyword to the occurrence bit "1". If any bit of the extracted n-th 64-bit is not set as the occurrence bit, the upper-level hierarchy bitmap generation unit 122 sets the bit produced by aggregating the n-th 64-bit section of the upper-level hierarchy bitmap for the first keyword to "0". The upper-level hierarchy bitmap generation unit 122 then repeats the generation processing until n becomes the final section of the 64-bit sections.

The character string or word string search unit 123 searches the encoded data corresponding to the character string of the search target or the word string of the search target as the search request using the upper-level hierarchy bitmap for the first keyword.

For example, the character string or word string search unit 123 refers to the upper-level hierarchy bitmap for the first keyword of the search target, which is generated by the upper-level hierarchy bitmap generation unit 122, and obtains the occurrence position of the occurrence bit. The character string or word string search unit 123 extracts the 64-bit section of the basic bitmap for the first keyword, which corresponds to the obtained occurrence position, from the bitmap type index 132.

The character string or word string search unit 123 then left shifts the 64-bit section of the basic bitmap for the extracted first keyword by one bit. The character string or word string search unit 123 corrects the upper-level hierarchy bitmap for the first keyword. This is because if an overflow occurs by left shifting the 64-bit section, the upper-level hierarchy bitmap has to be corrected. The character string or word string search unit 123 then refers to the corrected upper-level hierarchy bitmap for the first keyword and obtains the occurrence position of the occurrence bit. The character string or word string search unit 123 extracts a 64-bit section of the basic bitmap for the next keyword, which corresponds to the obtained occurrence position, from the bitmap type index 132. The character string or word string search unit 123 performs an AND operation between the basic bitmap for the first keyword and the basic bitmap for the next keyword for each extracted 64-bit section.

The character string or word string search unit 123 then determines whether or not there is a 64-bit section any bit of which indicates the occurrence bit among the 64-bit sections having been subjected to the AND operation. If there are no 64-bit sections, the character string or word string search unit 123 determines that there are no search targets. If there is a corresponding 64-bit section, the character string or word string search unit 123 further repeats search processing for a word string including the currently processed keyword and the next keyword or a character string. If there are no next keywords (words or characters) of the search target, the character string or word string search unit 123 determines that there is a search target.

The search result output unit 124 outputs a search result. For example, if the character string or word string search unit 123 determines that there is a search target, as a search result, the search result output unit 124 outputs a statement that there is a search target. If the character string or word string search unit 123 determines that there are no search targets, the search result output unit 124 output a statement that there are no search targets as a search result.

Processing Procedure of Encoding Processing According to First Embodiment

Figure 7:
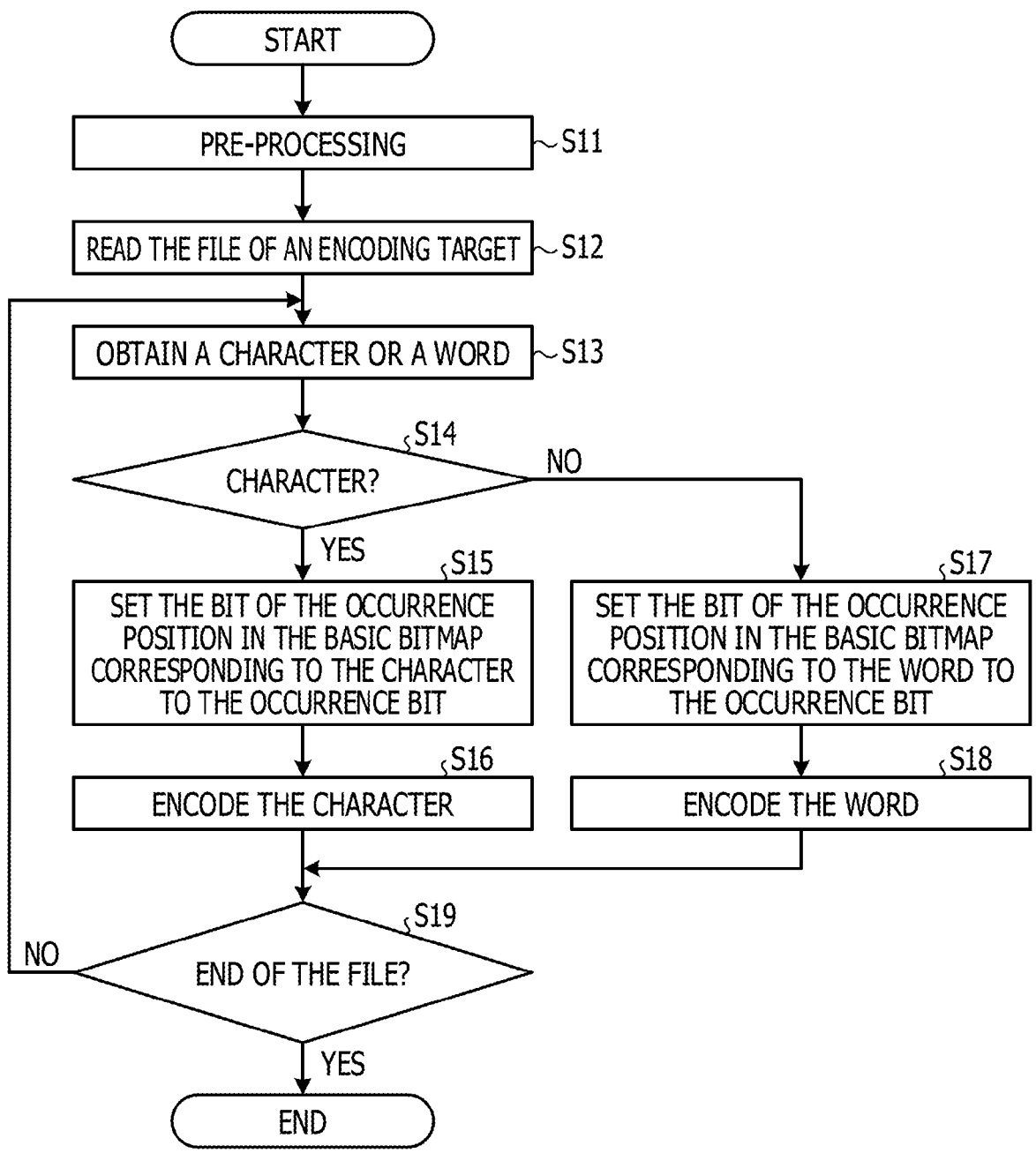
FIG. 7 is a diagram illustrating an example of the flowchart of the encoding processing according to the first embodiment.

A description will be given of the processing procedure of the encoding unit 110 illustrated in FIG. 6 with reference to FIG. 7. FIG. 7 is an example of the flowchart of the encoding processing according to the first embodiment.

As illustrated in FIG. 7, the encoding unit 110 performs pre-processing (step S11). For example, the encoding unit 110 obtains various storage areas in the storage unit 130. The encoding unit 110 then reads an encoding target file and stores the text data F1 in the storage area for reading (step S12).

The encoding unit 110 then obtains a character or a word from the storage area for reading (step S13). For example, the encoding unit 110 performs lexical analysis on the text data F1 stored in the storage area for reading and obtains a character or a word as the result of the lexical analysis in sequence from the beginning of the text data F1.

The encoding unit 110 determines whether or not the acquisition target is a character (step S14). If determined that the acquisition target is a character (step S14: Yes), the encoding unit 110 sets the bit of the occurrence position in the basic bitmap corresponding to the obtained character to the occurrence bit (step S15). For example, the encoding unit 110 extracts a basic bitmap corresponding to the obtained character from the bitmap type index 132. The encoding unit 110 sets a bit corresponding to the occurrence position of the obtained character in the text data F1 to the occurrence bit in the extracted basic bitmap.

The encoding unit 110 encodes the obtained character to static code recorded in the static dictionary 131 (step S16). The processing of the encoding unit 110 proceeds to step S19.

On the other hand, if determined that the acquisition target is not a character (step S14: No), the encoding unit 110 determines that the acquisition target is a word and sets the bit of the occurrence position in the basic bitmap for the word to the occurrence bit (step S17). For example, the encoding unit 110 extracts the basic bitmap for the obtained word from the bitmap type index 132. The encoding unit 110 sets a bit corresponding to the occurrence position of the obtained word in the text data F1 in the extracted basic bitmap to the occurrence bit.

The encoding unit 110 encodes the obtained word to static code recorded in the static dictionary 131 (step S18). The processing of the encoding unit 110 proceeds to step S19.

In step S19, the encoding unit 110 determines whether or not the processing has reached the end of the file (step S19). If the encoding unit 110 determines that the processing has not reached the end of the file (step S19: No), the processing of the encoding unit 110 proceeds to step S13 in order to obtain the next character or word.

On the other hand, if the encoding unit 110 determines that the processing has reached the end of the file (step S19: Yes), the encoding unit 110 terminates the encoding processing.

Processing Procedure of Search Processing According to First Embodiment

Figure 8:
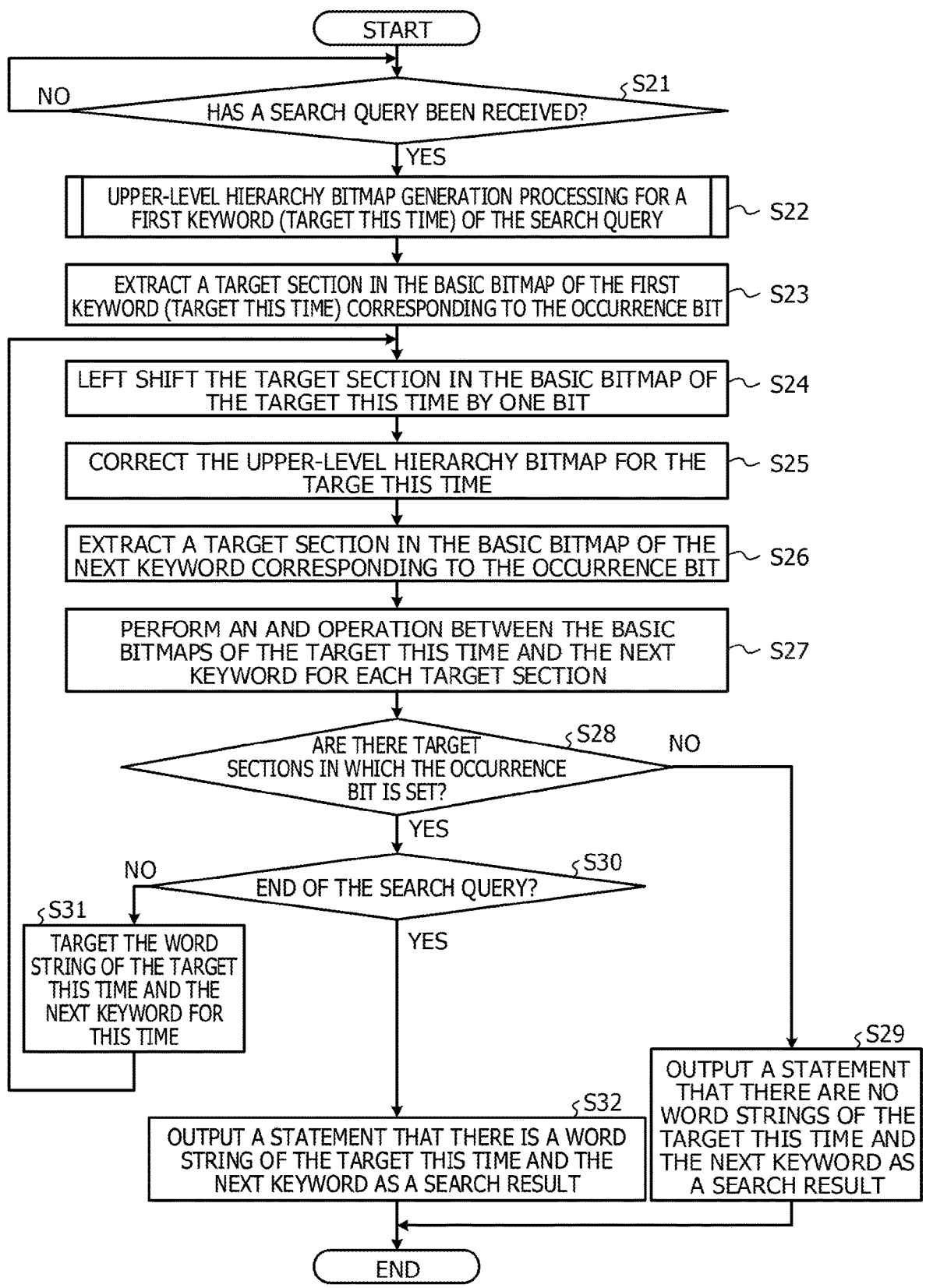
FIG. 8 is a diagram illustrating an example of the flowchart of the search processing according to the first embodiment.

A description will be given of the processing procedure of the search unit 120 illustrated in FIG. 6 with reference to FIG. 8. FIG. 8 is an example of the flowchart of the search processing according to the first embodiment. In this regard, it is assumed that a description will be given of the case where a search query is a word string as an example of the processing procedure of the search unit 120.

As illustrated in FIG. 8, the search unit 120 determines as to whether or not a search query has been received (step S21). If the search unit 120 determines that a search query has not been received (step S21: No), the search unit 120 repeats the determination processing until a search query is received.

On the other hand, if the search unit 120 determines that a search query has been received (step S21: Yes), the search unit 120 performs upper-level hierarchy bitmap generation processing for a first keyword (target this time) of the search query (step S22). In this regard, a description will be given later of the flowchart of the upper-level hierarchy bitmap generation processing.

The search unit 120 extracts a target section of the basic bitmap for the first keyword (target this time), which is the target section corresponding to the occurrence bit set in the upper-level hierarchy bitmap generated by the upper-level hierarchy bitmap generation processing (step S23). The 64-bit section is an example of the target section.

The search unit 120 left shifts the target section of the basic bitmap targeted this time by one bit (step S24). The search unit 120 then corrects the upper-level hierarchy bitmap for the target at this time (step S25). This is because the upper-level hierarchy bitmap has to be corrected in the case where an overflow occurs by left shifting the target section.

The search unit 120 extracts a target section of the basic bitmap for the next keyword, which is the target section corresponding to the occurrence bit set in the corrected upper-level hierarchy bitmap (step S26).

The search unit 120 then performs an AND operation between the basic bitmaps of the target this time and the next keyword for each target section (step S27). The search unit 120 determines whether or not there are target sections in which the occurrence bit is set among the target sections of the operation result (step S28). If the search unit 120 determines that there are no target sections having the occurrence bit (step S28: No), the search unit 120 outputs a statement that there are no word strings of the target this time and the next keyword as a search result (step S29). The search unit 120 then terminates the search processing.

On the other hand, if the search unit 120 determines that there is a target section having the occurrence bit (step S28: Yes), the search unit 120 determines that there is a word string of the target this time and the next keyword, and determines whether or not the processing has reached the end of the search query (step S30). If the search unit 120 determines that the processing has not reached the end of the search query (step S30: No), the search unit 120 targets the word string of the target this time and the next keyword (step S31). The processing of the search unit 120 proceeds to step S24 in order to search for the word string of the target this time and the next keyword.

On the other hand, if the search unit 120 determines that the processing has reached the end of the search query (step S30: Yes), the search unit 120 outputs a statement that there is a word string of the target this time and the next keyword as a search result (step S32). The search unit 120 then terminates the search processing.

Figure 9:
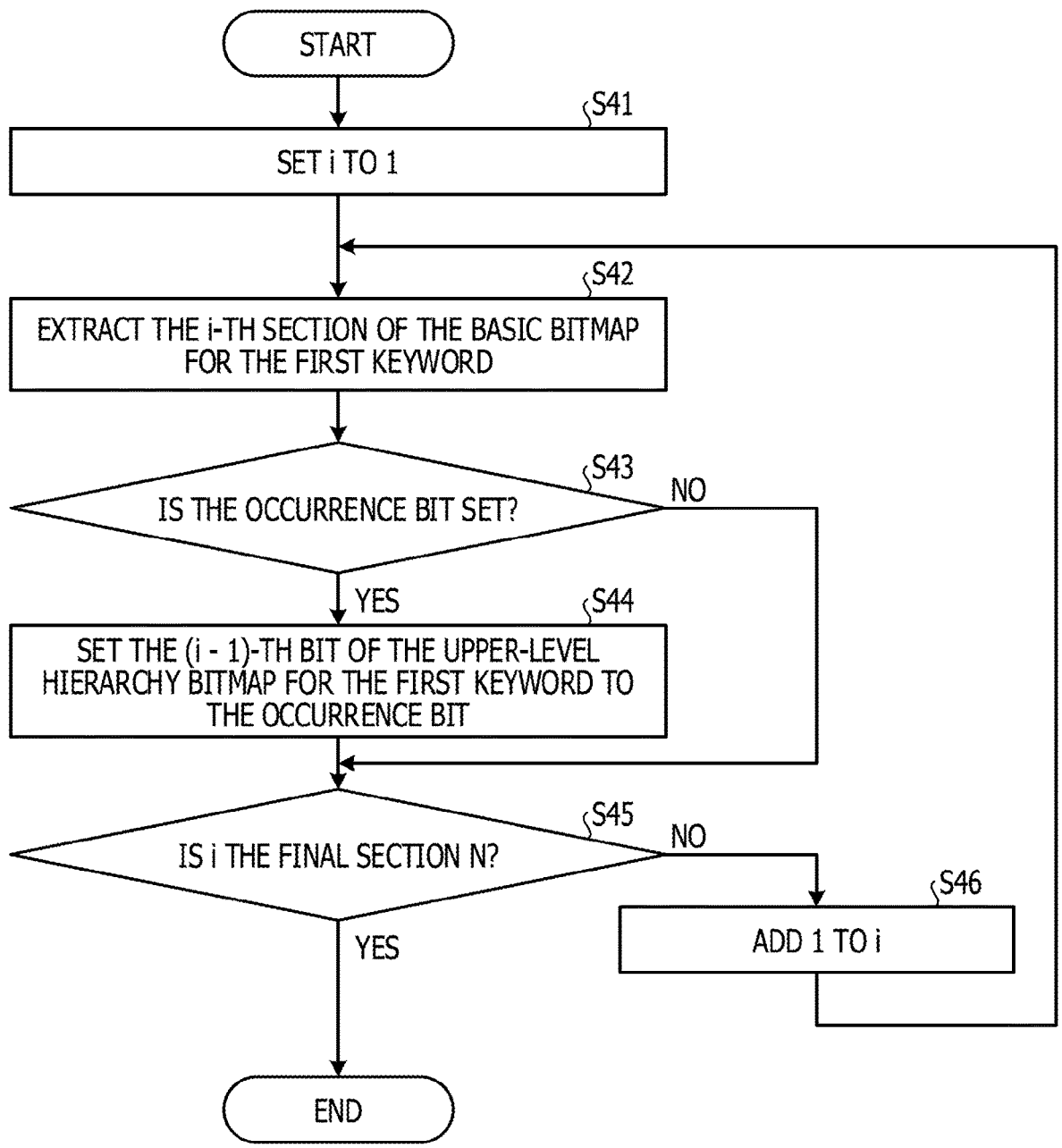
FIG. 9 is a diagram illustrating an example of the flowchart of upper-level hierarchy bitmap generation processing according to the first embodiment.

Processing procedure of upper-level hierarchy bitmap generation processing according to first embodiment FIG. 9 is an example of the flowchart of the upper-level hierarchy bitmap generation processing according to the first embodiment.

As illustrated in FIG. 9, the search unit 120 sets the index i to 1 (step S41). The search unit 120 extracts the i-th section among the basic bitmap for the first keyword from the bitmap type index 132 (step S42).

The search unit 120 determines whether or not any bit is set to the occurrence bit (step S43). If the search unit 120 determines that all the bits are not set to the occurrence bit (step S43: No), the processing of the search unit 120 proceeds to step S45.

On the other hand, if the search unit 120 determines that any bit is set to the occurrence bit (step S43: Yes), the search unit 120 sets the (i−1)-the bit of the upper-level hierarchy bitmap for the first keyword to the occurrence bit (step S44). That is to say, the search unit 120 sets the i-th section of the upper-level hierarchy bitmap for the first keyword. The processing of the search unit 120 then proceeds to step S45.

In step S45, the search unit 120 determines whether or not the index i is the final section N (step S45). If the search unit 120 determines that the index i is not the final section N (step S45: No), the search unit 120 adds 1 to the index i (step S46). The processing of the search unit 120 then proceeds to step S42 in order to perform the processing for the next section.

On the other hand, if the search unit 120 determines that the index i is the final section N (step S45: Yes), the search unit 120 terminates the upper-level hierarchy bitmap generation processing.

Advantages of First Embodiment

In this manner, in the first embodiment, the search unit 120 receives a search request for the encoded data. The search unit 120 generates second index information having a second axis which is superordinate to the first axis based on first index information having the occurrence position of a character or a word in the original data of the encoded data, which is the index information of the encoded data, and the contents of a search request. The search unit 120 then searches the encoded data in response to the search request using the second index information. With such a configuration, the search unit 120 generates second index information in accordance with the contents of a search request and then makes a search so that it is possible to narrow down the search in accordance with the contents of a search request at a high speed. Further, if a search request indicates a word string or a character string, it is possible for the search unit 120 to search at a high speed for a word string or a character string indicated by the search request using the first index information having the occurrence position as an axis. Further, it is possible for the search unit 120 to make a search on a granularity, such as for each register capacity, or the like while reducing the amount of calculation.

Also, in the first embodiment, the search unit 120 generates second index information having a second axis which is superordinate to the first axis for the first keyword of the search request using the first index information. With such a configuration, it is possible for the search unit 120 to generate second index information in accordance with the first keyword of the search request and then make a search so as to narrow down the range of the search request at a high speed. As a result, it is possible for the search unit 120 to reduce the amount of calculation in a search.

Second Embodiment

Incidentally, in the first embodiment, a description has been given that the search unit 120 generates second index information by superordiating the first axis based on the register capacity of the first index information. However, the search unit 120 is not limited to this and may generate second index information by superordinating the first axis based on a predetermined separation unit of the first index information. A predetermined separation unit is a separation unit of the text data F1, which is the original data of the encoded data, and includes, for example a file, a block, a chapter, a sentence, or the like. In this regard, it is assumed that a predetermined separator is subsequently referred to as an "item".

Thus, in the second embodiment, a description will be given of the case where second index information is generated by superordinating the first axis based on each item of the first index information.

Search Processing According to Second Embodiment

Figure 10:
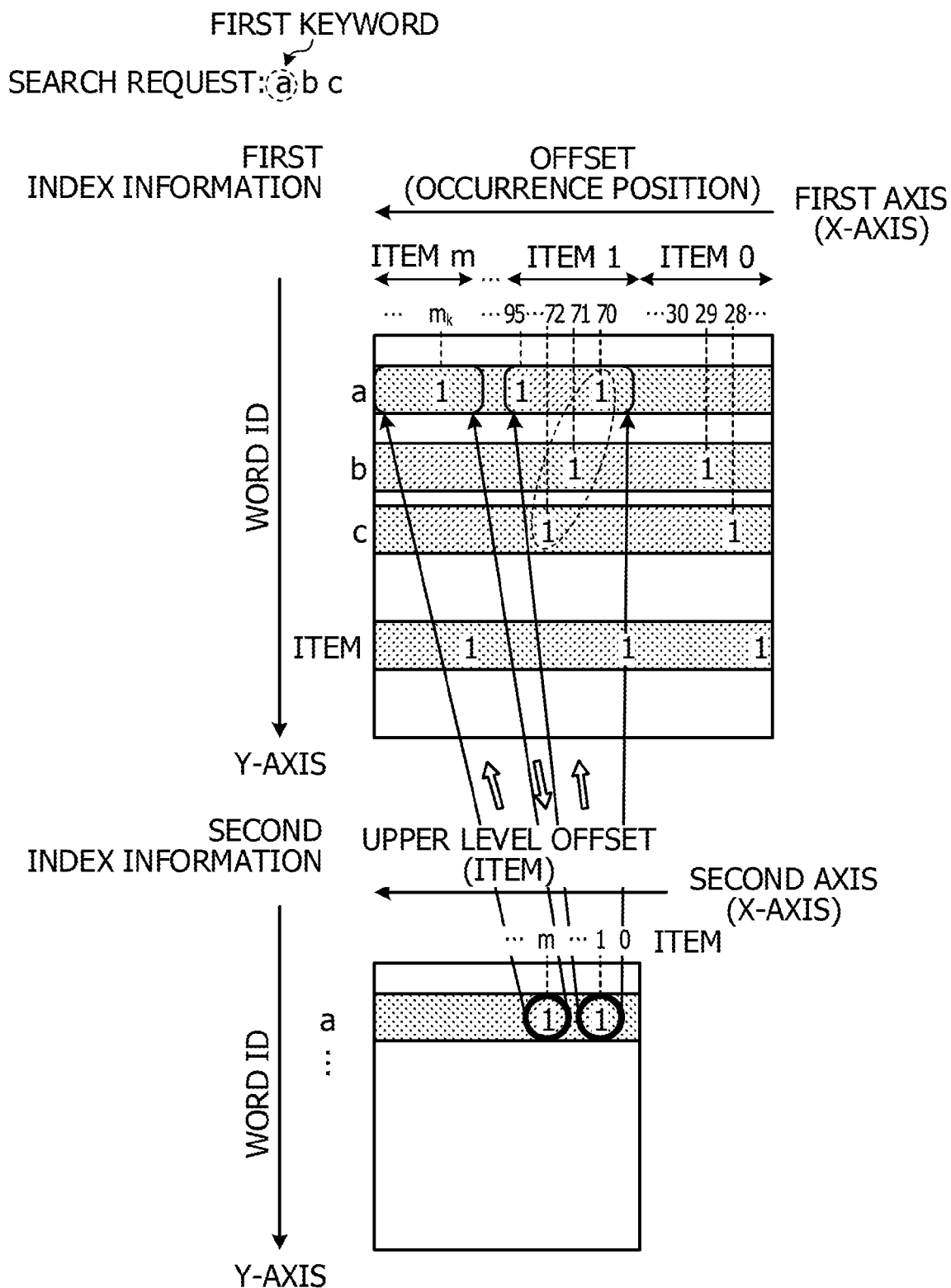
FIG. 10 is a schematic diagram illustrating search processing according to a second embodiment.

FIG. 10 is a schematic diagram illustrating the search processing according to the second embodiment. As illustrated in FIG. 10, in the search processing, a search request for the encoded data is received. The content of a search request is, for example, a character string or a word string. In the search processing, the following processing is then performed based on the first index information having the occurrence position in the original data of a character or a word of encoded data as a first axis and the contents of a search condition. That is to say, the search processing generates second index information having a second axis superordinate to the first axis of the first index information for each item. In the first index information, the beginning position of the original data of the encoded text data for the item is set to "1" as the occurrence bit. Accordingly, in the search processing, a determination is made that a section from a position which is set to the occurrence bit to a position before one bit of the next occurrence bit is one item, and second index information having a second axis which is superordinate to the first axis for each item is generated. The second axis is an axis for superordinating (aggregating) a bit string for each item of the first axis into each one bit. The second index information mentioned here is generated, for example, for the first keyword of the search request. The first keyword mentioned here refers to, for example, a first keyword (character or word) of the contents of the search request. In the search processing, a search is made on the encoded text data corresponding to the search request using the second index information.

Here, it is assumed that a word string "abc" has been received as a search request. Also, in the first index information, for the word ID indicated by a word, the occurrence position of the original data of the encoded text data is set to "1" as the occurrence bit. As an example, for the word ID of the word "a", the occurrence positions "70", "95" and "$m_k$" of the original data of the encoded text data are set as "1", and the like as the occurrence bit. For the word ID of the word "b", the occurrence position "71", or the like of the original data of the encoded text data is set as "1". For the word ID of the word "c", the occurrence position "72", or the like is set to "1" as the occurrence bit.

In the search processing, second index information having a second axis which is superordinate to the first axis of the first index information is generated based on the first index information and the contents of the search request. Here, in the search processing, the occurrence bit for the item of the first index information is referenced, and the second index information having a second axis produced by superordinating (aggregating) a bit string for each item of the first axis of the first index information into one bit is generated for the first keyword "a" of the search request. As an example, in the search processing, since "1" is set at any one bit corresponding to the item 1 for the first keyword "a", the occurrence position "1" corresponding to the item 1 of the second index information is set to "1" as the occurrence bit. In the search processing, any one bit corresponding to an item m for the first keyword "a" is set as "1", and thus the occurrence position "m" corresponding to the item m of the second index information is set to "1" as the occurrence bit.

In the search processing, a search is made to the encoded text data corresponding to the search request using the second index information. Here, in the search processing, the occurrence position (item No) which is set as "1" for the first keyword "a" of the search request is obtained using the second index information. The obtained occurrence positions (item Nos) are "1" and "m". In the search processing, an area corresponding to the item No from the first index information is extracted, and a word string "abc" indicated by the search request is searched from the extracted area. As an example, in the area corresponding to the item 1, the occurrence position "70" is set as the occurrence bit of the word "a", the occurrence position "71" is set as the occurrence bit of the word "b", and the occurrence position "72" is set as the occurrence bit of the word "c". Accordingly, the word string "abc" indicated by the search request is searched in the area corresponding to the item 1. On the other hand, in the area corresponding to the item m, the occurrence position "$m_k$" is set as the occurrence bit of the word a, but the occurrence position "$m_k+1$" is not set as the occurrence bit of the word b. Accordingly, the word string "abc" indicated by the search request is not found in the area corresponding to the item m.

In this manner, in the search processing, the search area is narrowed down by the upper-level hierarchy second index information based on for each item of the first index information so that it is possible to search for a word string or a character string that is indicated by the search request from the encoded text data at a high speed.

Encoding Processing According to Second Embodiment

Figure 11:
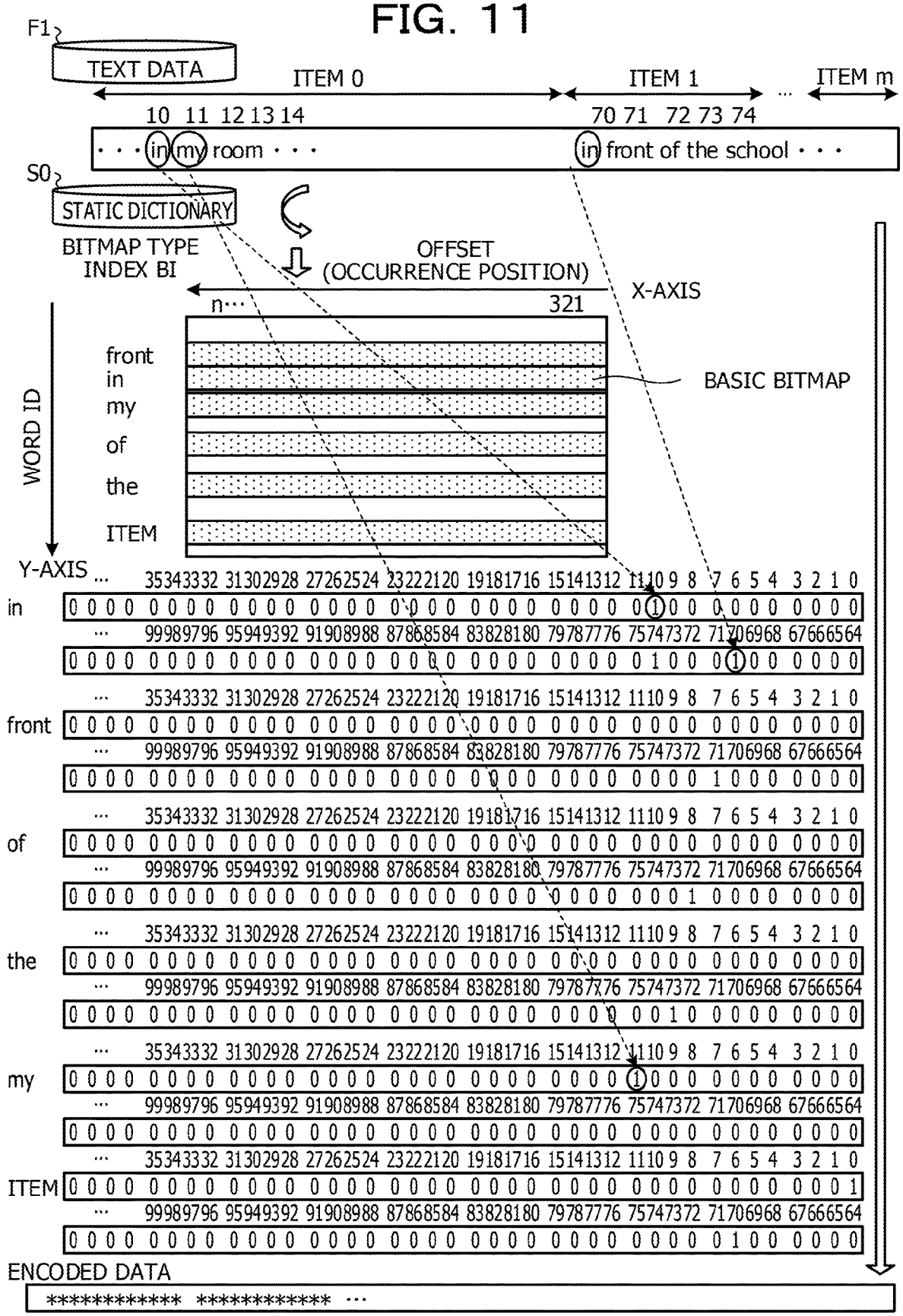
FIG. 11 is a diagram illustrating an example of the flow of encoding processing according to the second embodiment.

FIG. 11 is a diagram illustrating an example of the flow of the encoding processing according to the second embodiment. As illustrated in FIG. 11, in the encoding processing, a character or a word included in text data F1 of the encoding target is encoded in sequence using a static dictionary S0, and the encoded code is output to the encoded data. In the encoding processing, first index information having the occurrence position of a character or a word in the text data F1 as a first axis is generated. In the encoding processing, when the first index information is generated, the occurrence position that indicates the beginning position of each item regarding the first axis for the item is set to the occurrence bit.

The static dictionary S0 mentioned here is a dictionary in which the occurrence frequency of a word that occurs in a document is identified based on English dictionaries, Japanese dictionaries, school textbooks, and the like in general, and a word having a higher occurrence frequency is given a shorter code. In the static dictionary S0, a static code, which is a code corresponding to each word, is recorded in advance.

The first index information mentioned here refers to a "bitmap type index" and is denoted by a sign BI. A character mentioned here is, for example, a CJK character. A word mentioned here refers to, for example, an English word. In this regard, in the following, a description will be given of the case where the text data F1 is formed by words. However, the present embodiment is not limited to this, and the text data F1 may be formed by characters.

Here, a description will be given of the bitmap type index BI. The bitmap type index BI includes a pointer that specifies a word included in the text data F1 of the encoding target and a bit string that links a bit indicating the presence or absence of a word at an offset (occurrence position) in the text data F1. That is to say, the bitmap type index BI refers to a bitmap that indexes the presence or absence of a word included in the text data F1 of the encoding target for each offset (occurrence position). As an example, if a word exists at a certain occurrence position in the text data F1, the occurrence position is set to ON as the presence or absence of an offset (occurrence position) corresponding to the occurrence position, for example, is set to a binary number "1" as the occurrence bit. If a word does not exist at a certain occurrence position in the text data, the occurrence position is set to OFF as the presence or absence of an offset (occurrence position) corresponding to the occurrence position, for example, is set to a binary number "0". As a pointer that specifies a word, for example, the word ID of a word is employed. The word ID may be the word itself or may be a sign of the word. The sign of a word refers to an encoded code and, as an example, corresponds to a static code.

For example, as illustrated in FIG. 11, the X-axis of the bitmap type index BI represents an offset (occurrence position), and the Y-axis represents a word ID. That is to say, each bitmap included in the bitmap type index BI represents the presence or absence of a word denoted by the word ID for each offset (occurrence position). In this regard, it is assumed that each bitmap included in the bitmap type index BI may also be referred to as a "basic bitmap".

Here, a word "in" occurs at the 10th position in the text data F1 of the encoding target, and thus the occurrence position of the 10th bit in the basic bitmap corresponding to the word "in" is set to ON, that is to say, is set to the occurrence bit denoted by the binary number of "1". A word "my" occurs at the 11th position of the text data F1 of the encoding target, and thus the occurrence position of the first bit of the basic bitmap corresponding to the word "my" is set to ON, that is to say, is set to the occurrence bit denoted by the binary number of "1". The word "in" occurs at the 70th position of the text data F1 of the encoding target, and thus the occurrence position of the 70th bit in the basic bitmap corresponding to the word "in" is set to ON, that is to say, is set to the occurrence bit denoted by the binary number of "1". Since "item 1" starts from the 70th bit, the occurrence position at the 70th bit of the basic bitmap corresponding to the item is set to ON, that is to say, is set to the occurrence bit indicating the binary number of "1". In this regard, each time a word in the text data F1 is encoded, the occurrence position in the basic bitmap corresponding to the word is set to the occurrence bit in the bitmap type index BI. Also, if a word in the text data F1 is the beginning of the item, the occurrence position of the basic bitmap corresponding to the item is set to the occurrence bit of the bitmap type index BI.

Search Processing According to Second Embodiment

Figure 12A:
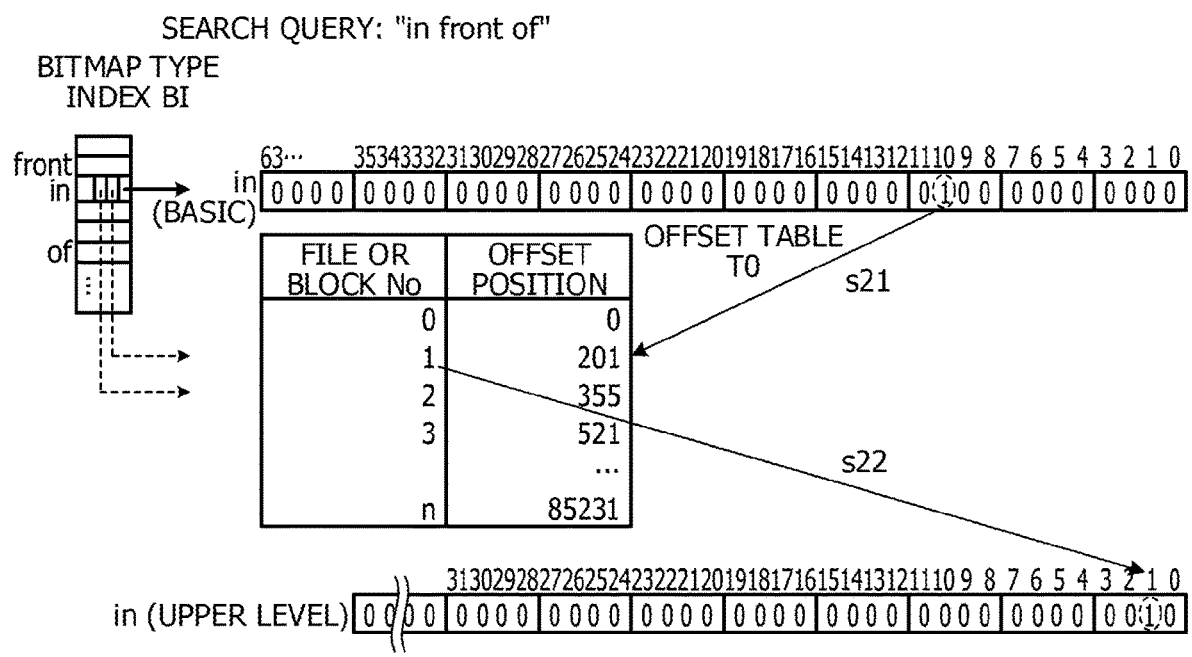
FIG. 12A is a diagram (1) illustrating an example of the flow of the search processing according to the second embodiment.
Figure 12B:
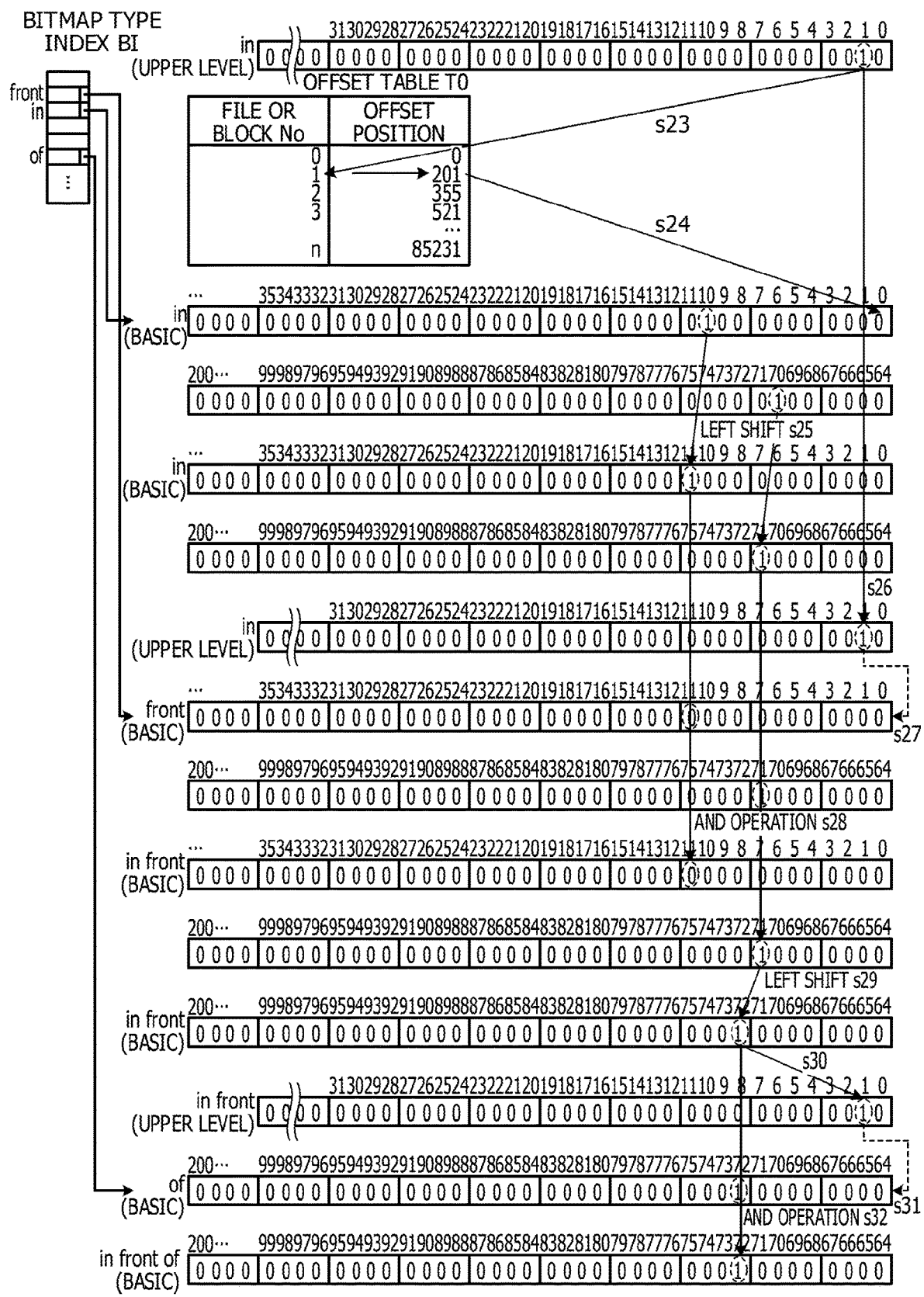
FIG. 12B is a diagram (2) illustrating an example of the flow of the search processing according to the second embodiment.

FIG. 12A and FIG. 12B are diagrams illustrating an example of the flow of the search processing according to the second embodiment. As illustrated in FIG. 12A and FIG. 12B, in the search processing, the following processing is performed based on the bitmap type index BI and the contents including a separation unit of the text data F1 of the search query. That is to say, in the search processing, an upper-level hierarchy bitmap having a second axis produced by superordinating (aggregating) the first axis of the bitmap type index BI is generated. The second axis is an axis produced by superordinating (aggregating) a bit string of the first axis for each separation unit into one bit. The first keyword is a first keyword (word) of the search query. In the search processing, a search is made of the encoded data corresponding to the search query using the upper-level hierarchy bitmap for the first keyword.

In this regard, a description will be given subsequently that the second axis is produced by superordinating (aggregating) a bit string of the first axis for each file or block into one bit.

As illustrated in FIG. 12A, in the search processing, a search query on the encoded data is received. Here, the contents of the search query are a word string "in front of".

In the search processing, an upper-level hierarchy bitmap for the first keyword of the word string indicated by the search query is generated by referring to the bitmap type index BI.

For example, in the search processing, the second 64-bit section in the basic bitmap for the first keyword is extracted from the bitmap type index BI. In the search processing, if any bit in the extracted second 64-bit section is set as the occurrence bit, a file or block No associated with the position (offset position) which is set to the occurrence bit is identified based on an offset table T0 (s21). The offset table T0 mentioned here is a table in which a separator in the text data T1 is represented by a file or block No and an offset position in the text data T1. Here, the first keyword is "in". The 10th bit in the first 64-bit section of the basic bitmap for "in" is set as the occurrence bit of "1". In the search processing, the file or block No "1" associated with the 10th bit which is set to the occurrence bit is identified based on the offset table T0.

In the search processing, a section having the identified file or block No of the upper-level hierarchy bitmap for the first keyword is generated. That is to say, in the search processing, the occurrence position corresponding to the identified file or block No of the upper-level hierarchy bitmap for the first keyword is set to the occurrence bit of "1" (s22). Here, the file or block No "1" is identified, and thus the first bit of the upper-level hierarchy bitmap for "in" is set to the occurrence bit of "1".

In the same manner, in the search processing, a 64-bit section of the upper-level hierarchy bitmap for the first keyword is extracted in sequence until there are no 64-bit sections in the basic bitmap for the first keyword. In the search processing, if any bit of the extracted 64-bit section is set as the occurrence bit, a file or block No associated with the offset position which is set to the occurrence bit is identified based on the offset table T0. In the search processing, a section having the identified file or block No of the upper-level hierarchy bitmap for the first keyword is generated. That is to say, in the search processing, the occurrence position corresponding to the identified file or block No of the upper-level hierarchy bitmap for the first keyword is set to the occurrence bit of "1".

As illustrated in FIG. 12B, in the search processing, the upper-level hierarchy bitmap for the first keyword is referenced, and the occurrence position of the occurrence bit is obtained. In the search processing, a file or block No associated with the occurrence position of the occurrence bit is identified based on the offset table T0 (s23), and an offset position associated with the identified file or block No is identified. In the search processing, a target section of the basic bitmap for the first keyword, which corresponds to the identified offset position, is extracted from the bitmap type index BI (s24). Here, the "first" bit of the upper-level hierarchy bitmap for "in" is set as "1", and thus in the search processing, a file or block No "1" associated with the "first" bit is identified. In the search processing, the offset position "201" associated with the identified file or block No "1" is identified. In then search processing, the target section of a file or block No "1" corresponding to the offset position "201" is extracted from the bitmap type index BI. In this regard, the target section of the file or block No "1" corresponds to the basic bitmaps 0 to 201 for "in", and the 10th bit and the 70th bit is set to the occurrence bit.

In the search processing, each target section is then left shifted by one bit for each extracted target section (s25). Here, the 11th bit and the 71st bit of the target section of the file or block No "1" are set to "1".

In the search processing, the upper-level hierarchy bitmap for the first keyword is corrected (s26). This is because if an overflow occurs by the left shifting the target section, this situation has to be handled. That is to say, if the most significant bit of the target section is set as "1", an overflow occurs by left shifting the target section. At this time, the occurrence position of the upper-level hierarchy bitmap which has not been set as "1" by the overflow, and the occurrence position of the upper-level hierarchy bitmap for the occurrence position which is newly set to "1" are corrected. Here, an overflow does not occur by left shifting the target section, and thus the upper-level hierarchy bitmap for "in" is not corrected.

In the search processing, the upper-level hierarchy bitmap for the first keyword is referenced, and the occurrence position of the occurrence bit is obtained. In the search processing, the target section of the basic bitmap for the next keyword of the search query corresponding to the occurrence position obtained from the bitmap type index BI is extracted (s27). Here, the next keyword of the search query is "front". The "1st bit" of the upper-level hierarchy bitmap for "in" is set as occurrence bit "1", and thus in the search processing, the target section of the file or block No "1" in the basic bitmap for "front", which is the target section corresponding to the "first" bit, is extracted. In this regard, the target section of the file or block No "1" in the basic bitmap for "front" corresponds to the basic bitmaps 0 to 201 for "front", and the 71st bit is set as the occurrence bit.

In the search processing, an AND operation is performed between the basic bitmap for the first keyword and the basic bitmap for the next keyword in the search query for each extracted target section (s28). Here, in the search processing, an AND operation is performed between the basic bitmap for "in" and the basic bitmap for the next keyword "front" in the search query for the target section of the block No "1". The result of the AND operation is the target section of the file or block No "1" in the basic bitmap for "in front". In the target section of the file or block No "1", the 11th bit is "0", and the 71st bit is "1".

In the search processing, a determination is made as to whether or not there is a target section any one bit of which indicates "1" among the target sections having been subjected to the AND operation. Here, the target section having been subjected to the AND operation is the target section of the file or block No "1" in the basic bitmap for "in front". In the target section of the file or block No "1", the 71st bit is "1". Accordingly, in the search processing, a determination is made that there is a target section having the file or block No "1" as a target section any bit of which indicates "1".

In the search processing, the target section any one bit of which indicates "1" is left shifted by one bit among the target sections having been subjected to the AND operation (s29). Here, in the search processing, the target section of the file or block No "1" in the basic bitmap for "in front" is left shifted by one bit. In the target section of the file or block No "1" in the basic bitmap for "in front", the 72nd bit is set to "1".

In the search processing, the upper-level hierarchy bitmap for the word string of the first keyword and the next keyword is corrected (s30). This is because the situation has to be handled in the case where an overflow occurs by left shifting the target section. That is to say, if the most significant bit of the target section is "1", an overflow occurs by left shifting the target section. At this time, the occurrence position of the upper-level hierarchy bitmap for the occurrence position of the bit which has not been set to "1" by the overflow and the occurrence position of the upper-level hierarchy bitmap for the occurrence position of the bit which is newly set to "1" are corrected. Here, since an overflow does not occur by left shifting the target section, the upper-level hierarchy bitmap for "in front" is not corrected.

In the search processing, the upper-level hierarchy bitmap for the word string of the first keyword and the next keyword is referenced, and the occurrence position of the occurrence bit is obtained. In the search processing, the target section of the basic bitmap for the next keyword of the search query, which corresponds to the obtained occurrence position, is further extracted from the bitmap type index BI (s31). Here, the further next keyword of the search query is "of". The "first" bit of the upper-level hierarchy bitmap for "in front" is set as "1", and thus in the search processing, the target section of the file or block No "1" in the basic bitmap for "front", which is the target section corresponding to the "first" bit, is extracted. In this regard, the target section of the file or block No "1" in the basic bitmap for "of" corresponds to the basic bitmaps 0 to 201 for "of", and the 72nd-bit is set to the occurrence bit.

In the search processing, an AND operation is performed between the basic bitmap for the word string of the first keyword and the next keyword, and the basic bitmap for the further next keyword of the search query for each extracted target section (s32). Here, in the search processing, an AND operation is performed between the basic bitmap for "in front" and the basic bitmap for the further next keyword "of" of the search query for the target section of the file or block No "1". The result of the AND operation is the target section of the file or block No "1" in the basic bitmap for "in front of". In the target section of the file or block No "1", the 72nd-bit is "1".

In the search processing, a determination is made as to whether or not there is a target section any bit of which indicates "1" among the target sections having been subjected to the AND operation. Here, the target section having been subjected to the AND operation is the target section of the file or block No "1" in the basic bitmap for "in front of". In the target section of the file or block No "1", the 72nd bit is "1". Accordingly, in the search processing, a determination is made that the target section having the file or block No "1" exists as a target section any bit of which indicates "1". That is to say, in the search processing, a statement that the search query "in front of" exists is output as a search result. In this regard, in the search processing, the search query exists at which occurrence position of the target section of which file or block No may be output as a search result. Here, in the search processing, the existence of "in front of" at the 72nd-bit of the target section of the file or block No "1" may be output as a search result.

Configuration of Information Processing Apparatus

Figure 13:
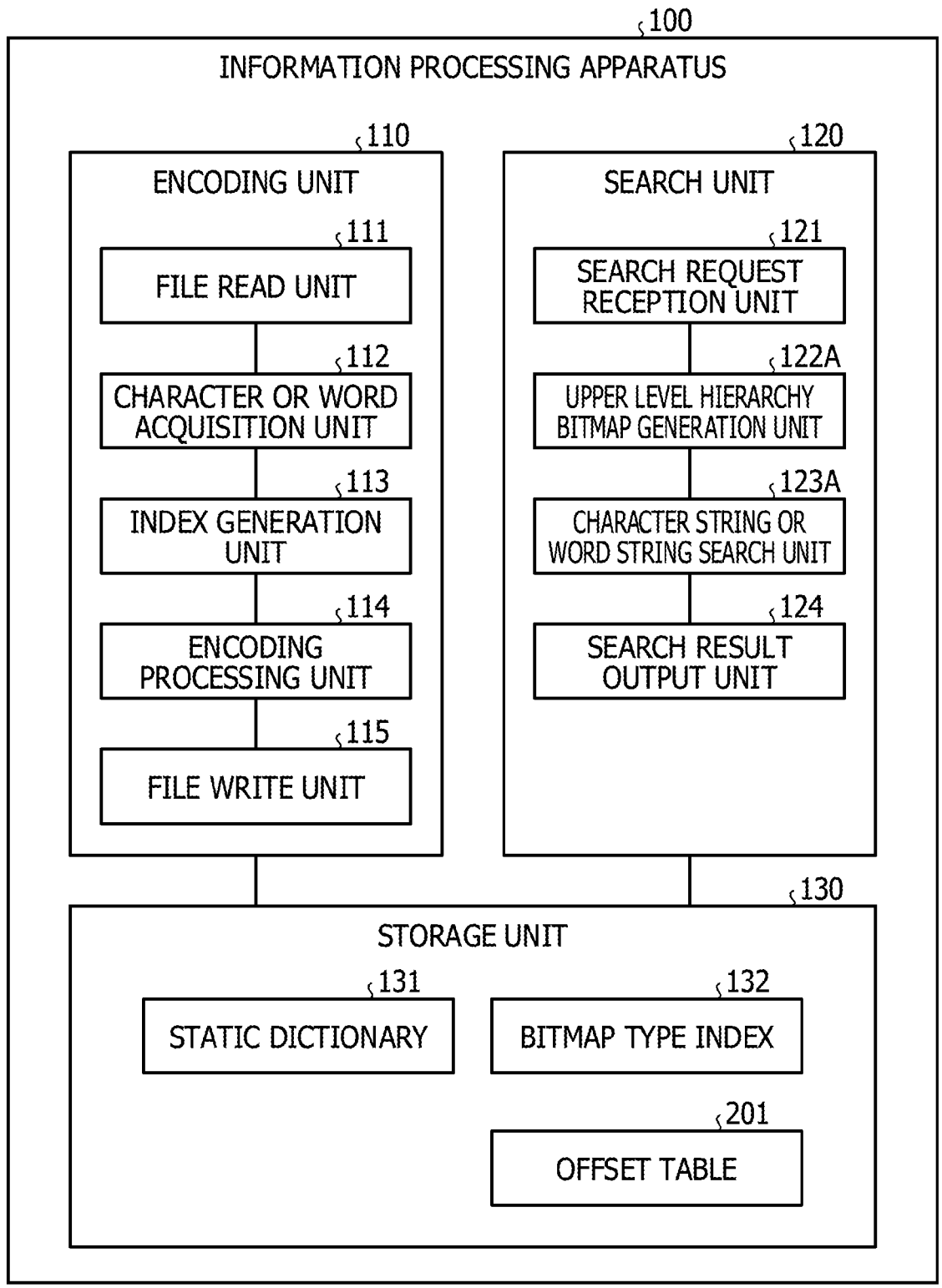
FIG. 13 is a functional block diagram illustrating an example of the configuration of an information processing apparatus according to the second embodiment.

FIG. 13 is a block diagram illustrating the functional configuration of an information processing apparatus according to the second embodiment. In this regard, the same component as that in the information processing apparatus 100 illustrated according to a first embodiment FIG. 6 is given the same sign, and a description of the duplicated component and operation will be omitted. The first embodiment and the second embodiment differ in that the upper-level hierarchy bitmap generation unit 122 of the search unit 120 is changed to an upper-level hierarchy bitmap generation unit 122A, and the character string or word string search unit 123 is changed to a character string or word string search unit 123A. Also, the first embodiment and the second embodiment differ in that an offset table 201 is added. The upper-level hierarchy bitmap generation unit 122A is an example of the generation unit. The character string or word string search unit 123A is an example of the search unit.

Figure 14:
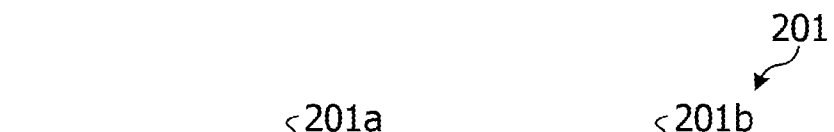
FIG. 14 is a diagram illustrating an example of the data structure of an offset table according to the second embodiment.

The offset table 201 corresponds to the offset table T0 in FIG. 12A and FIG. 12B. Here, a description will be given of an example of the data structure of the offset table 201 with reference to FIG. 14. FIG. 14 is a diagram illustrating an example of the data structure of an offset table according to the second embodiment. As illustrated in FIG. 14, in the offset table 201, an offset position 201b and an item No 201a are stored in association with each other. An item No 201a is an identification number separated by an item. As an item, a file, a block, a chapter, a sentence, or the like is given. In this regard, the offset table 201 may be divided for each item. That is to say, the offset table 201 may be divided into an offset table 201A in the case where the item is a file, an offset table 201B in the case where the item is a block, an offset table 201C in the case where the item is a chapter, and an offset table 201D in the case where the item is a sentence. In such a case, a search request ought to include an item type of a search target.

As an example, in the case where the item No 201a is "0", "0" is stored as the offset position 201b. In the case where the item No 201a is "1", "201" is stored as the offset position 201b. In the case where the item No 201a is "2", "355" is stored as the offset position 201b.

The upper-level hierarchy bitmap generation unit 122A generates an upper-level hierarchy bitmap having a second axis which is superordinate to the first axis based on the bitmap type index 132 and the contents of the search request. In this regard, the contents of the search request may include an item type indicating a separation unit of the text data F1, which is the original data of the encoded data. The second axis is an axis produced by superordinating (aggregating) a bit string for each separation unit of the first axis into one bit. For example, the upper-level hierarchy bitmap generation unit 122A extracts, from the bitmap type index 132, the n-th 64-bit section in the basic bitmap for the first keyword of the search request. In this regard, n is a natural number of 1 or more. If any bit of the extracted n-th 64-bit section is set as the occurrence bit, the upper-level hierarchy bitmap generation unit 122A identifies an item No 201a associated with the occurrence position which is set to the occurrence bit based on the offset table 201. The upper-level hierarchy bitmap generation unit 122A then sets the bit produced by aggregating the identified section of the item No 201a to the occurrence bit "1" among the upper-level hierarchy bitmap for the first keyword. The upper-level hierarchy bitmap generation unit 122 then repeats the generation processing until n becomes the final section of the 64-bit sections.

The character string or word string search unit 123A searches the encoded data corresponding to the character string of the search target or the word string of the search target as the search request using the upper-level hierarchy bitmap for the first keyword.

For example, the character string or word string search unit 123A refers to the upper-level hierarchy bitmap for the first keyword of the search target, which is generated by the upper-level hierarchy bitmap generation unit 122, and obtains the occurrence position of the occurrence bit. The character string or word string search unit 123A then identifies an item No 201a associated with the occurrence position of the obtained occurrence bit based on the offset table 201 and identifies the offset position 201b associated with the identified item No 201a. The character string or word string search unit 123A then extracts, from the bitmap type index 132, a target section in the basic bitmap for the first keyword, which is the target section corresponding to the identified offset position 201b.

The character string or word string search unit 123A then left shifts the target section of the basic bitmap for the extracted first keyword by one bit. The character string or word string search unit 123A corrects the upper-level hierarchy bitmap for the first keyword. This is because if an overflow occurs by left shifting the target section, the upper-level hierarchy bitmap has to be corrected. The character string or word string search unit 123A then refers to the corrected upper-level hierarchy bitmap for the first keyword and obtains the occurrence position of the occurrence bit. The character string or word string search unit 123A extracts, from the bitmap type index 132, a target section of the basic bitmap for the next keyword, which corresponds to the target section of the obtained occurrence position. The character string or word string search unit 123A performs an AND operation between the basic bitmap for the first keyword and the basic bitmap for the next keyword for each extracted target section.

The character string or word string search unit 123A then determines whether or not there is a target section any bit of which indicates the occurrence bit among the target sections having been subjected to the AND operation. If there are no target sections, the character string or word string search unit 123A determines that there are no search targets. If there is a corresponding target section, the character string or word string search unit 123A further repeats search processing for a word string including the currently processed and the next keyword or a character string. If there are no next keyword (word or character) of the search target, the character string or word string search unit 123A determines that there is a search target.

Processing Procedure of Search Processing According to Second Embodiment

Figure 15A:
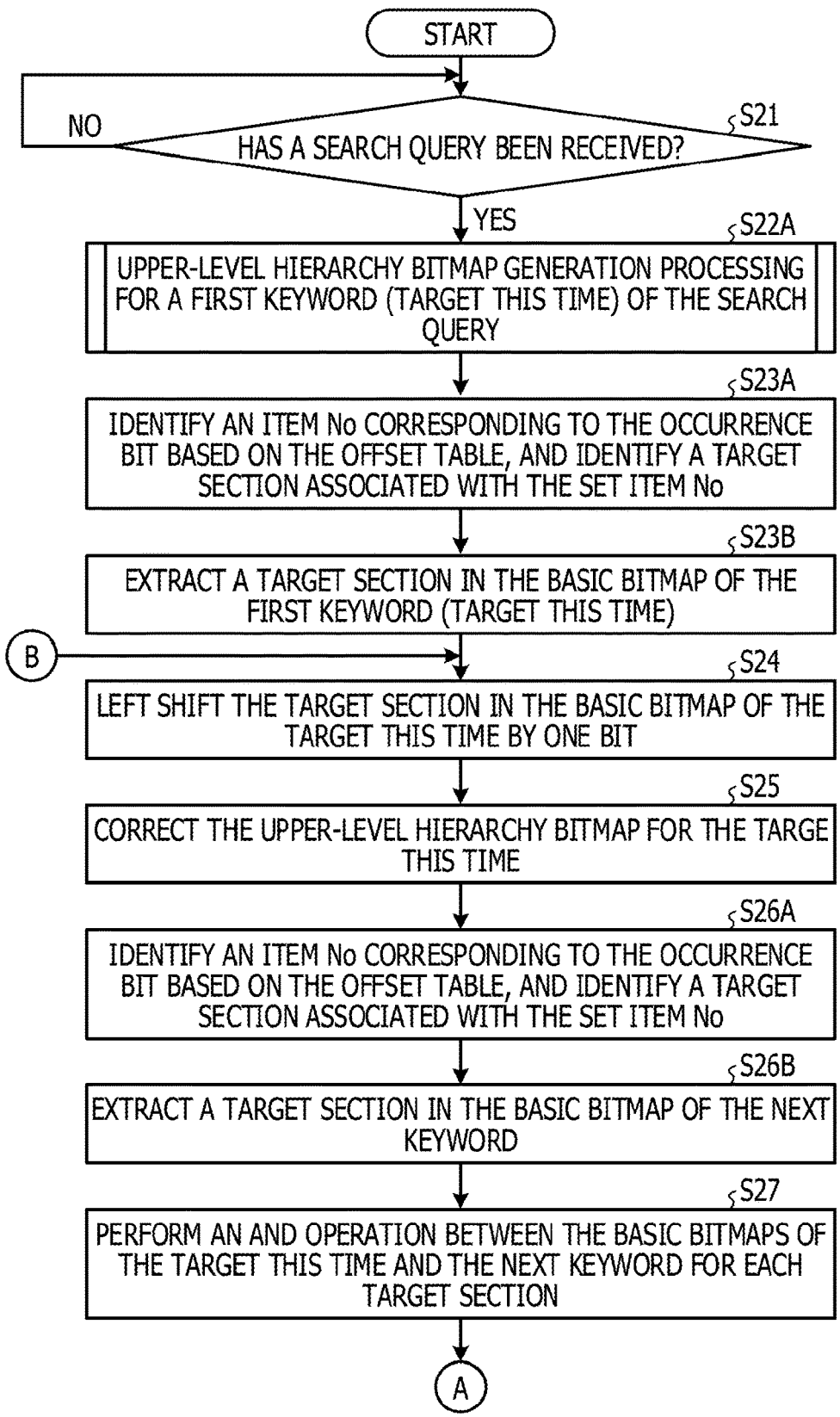
FIGS. 15A and 15B are examples of the flowchart of search processing according to the second embodiment.
Figure 15B:
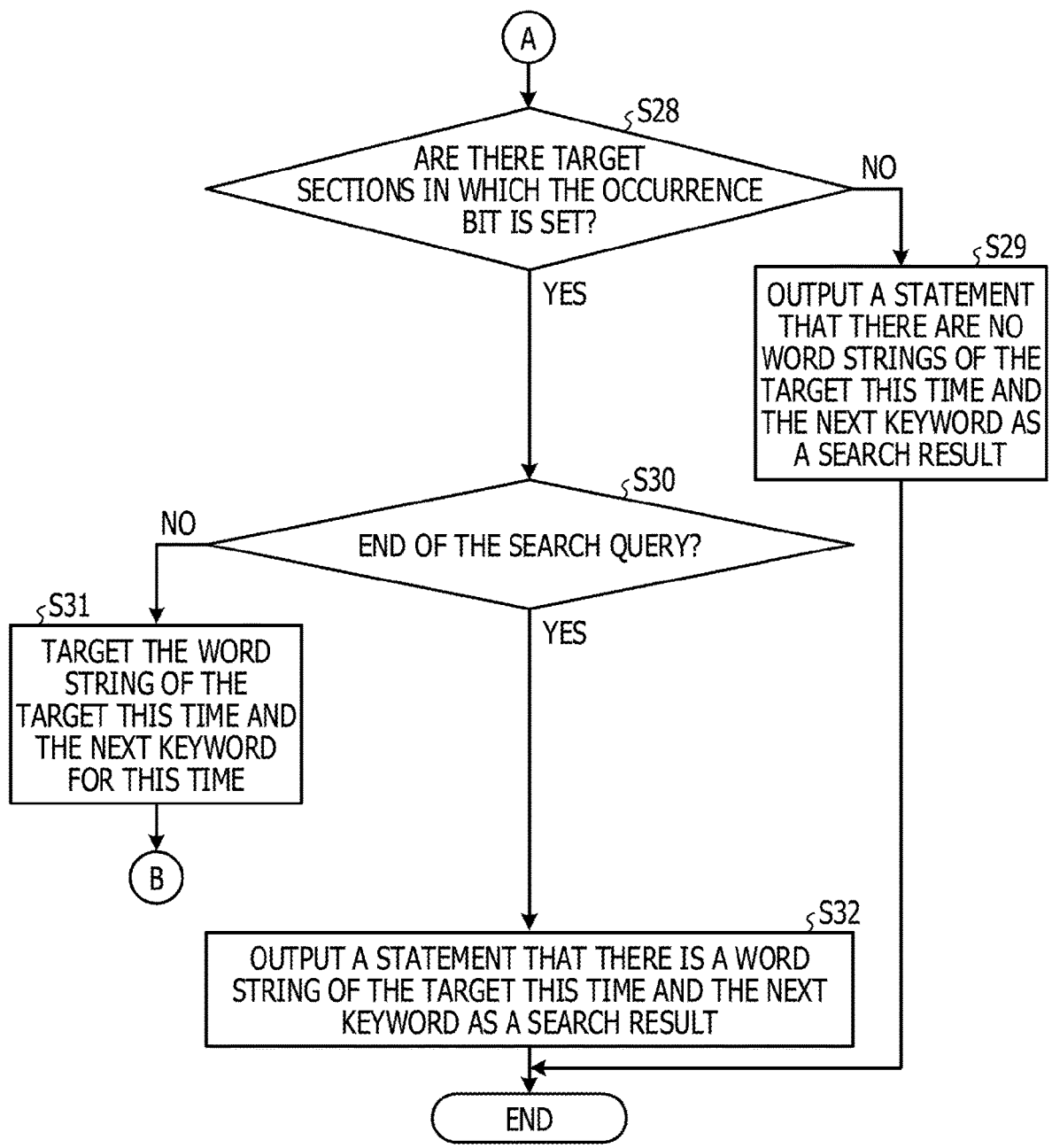

A description will be given of the processing procedure of the search unit 120 illustrated in FIG. 13 with reference to FIGS. 15A sand 15B. FIGS. 15A and 15B are examples of the flowchart of search processing according to the second embodiment. In this regard, it is assumed that a description will be given of the case where the search query is a word string as an example of the processing procedure of the search unit 120. Also, the same processing as that of the flowchart of the search processing illustrated in FIG. 8 is given the same sign, and a description will be omitted of the duplicated processing. The first embodiment and the second embodiment differ in the points of S22A, S23A, S23B, S26A, and S26B.

As illustrated in FIGS. 15A and 15B, the search unit 120 determines as to whether or not a search query has been received (step S21). If the search unit 120 determines that a search query has not been received (step S21: No), the search unit 120 repeats the determination processing until a search query is received.

On the other hand, if the search unit 120 determines that a search query has been received (step S21: Yes), the search unit 120 performs upper-level hierarchy bitmap generation processing for a first keyword (the target this time) of the search query (step S22A). In this regard, a description will be given later of the flowchart of the upper-level hierarchy bitmap generation processing.

The search unit 120 then identifies an item No 201a corresponding to the occurrence bit of the upper-level hierarchy bitmap based on the offset table 201 and identifies the target section associated with the identified item No 201a (step S23A). For example, the search unit 120 identifies the item No 201a associated with the occurrence position of the occurrence bit of the generated upper-level hierarchy bitmap based on the offset table 201. The search unit 120 identifies the offset position 201b associated with the identified item No 201a from the bitmap type index 132. The search unit 120 then identifies the target sections from the offset position 201b just before the currently identified offset position 201b to the currently identified offset position 201b.

The search unit 120 then extracts, from the bitmap type index 132, a target section of the basic bitmap for the first keyword (the target this time), which is the identified target section (step S23B).

The search unit 120 left shifts the target section of the basic bitmap targeted this time by one bit (step S24). The search unit 120 then corrects the upper-level hierarchy bitmap for the target at this time (step S25). This is because the upper-level hierarchy bitmap has to be corrected in the case where an overflow occurs by left shifting the target section.

The search unit 120 identifies an item No 201a corresponding to the occurrence bit of the corrected upper-level hierarchy bitmap based on the offset table 201 and identifies a target section associated with the identified item No 201a (step S26A). For example, the search unit 120 identifies an item No 201a associated with the occurrence position of the occurrence bit of the corrected upper-level hierarchy bitmap based on the offset table 201. The search unit 120 identifies an offset position 201b associated with the identified item No 201a from the bitmap type index 132. The search unit 120 then identifies the target sections from the offset position 201b just before the currently identified offset position 201b to the currently identified offset position 201b.

The search unit 120 then extracts, from the bitmap type index 132, a target section of the basic bitmap for next keyword of the search query, which is the identified target section (step S26B).

The search unit 120 then performs an AND operation between the basic bitmaps of the target this time and the next keyword for each target section (step S27). The search unit 120 determines whether or not there are target sections in which the occurrence bit is set among the target sections of the operation result (step S28). If the search unit 120 determines that there are no target sections having the occurrence bit (step S28: No), the search unit 120 outputs a statement that there are no word strings of the target this time and the next keyword as a search result (step S29). The search unit 120 then terminates the search processing.

On the other hand, if the search unit 120 determines that there is a target section having the occurrence bit (step S28: Yes), the search unit 120 determines that there is a word string of the target this time and the next keyword, and determines whether or not the processing has reached the end of the search query (step S30). If the search unit 120 determines that the processing has not reached the end of the search query (step S30: No), the search unit 120 targets the word string of the target this time and the next keyword (step S31). The processing of the search unit 120 proceeds to step S24 in order to search for the word string of the target this time and the next keyword.

On the other hand, if the search unit 120 determines that the processing has reached the end of the search query (step S30: Yes), the search unit 120 outputs a statement that there is a word string of the target this time and the next keyword as a search result (step S32). The search unit 120 then terminates the search processing.

Figure 16:
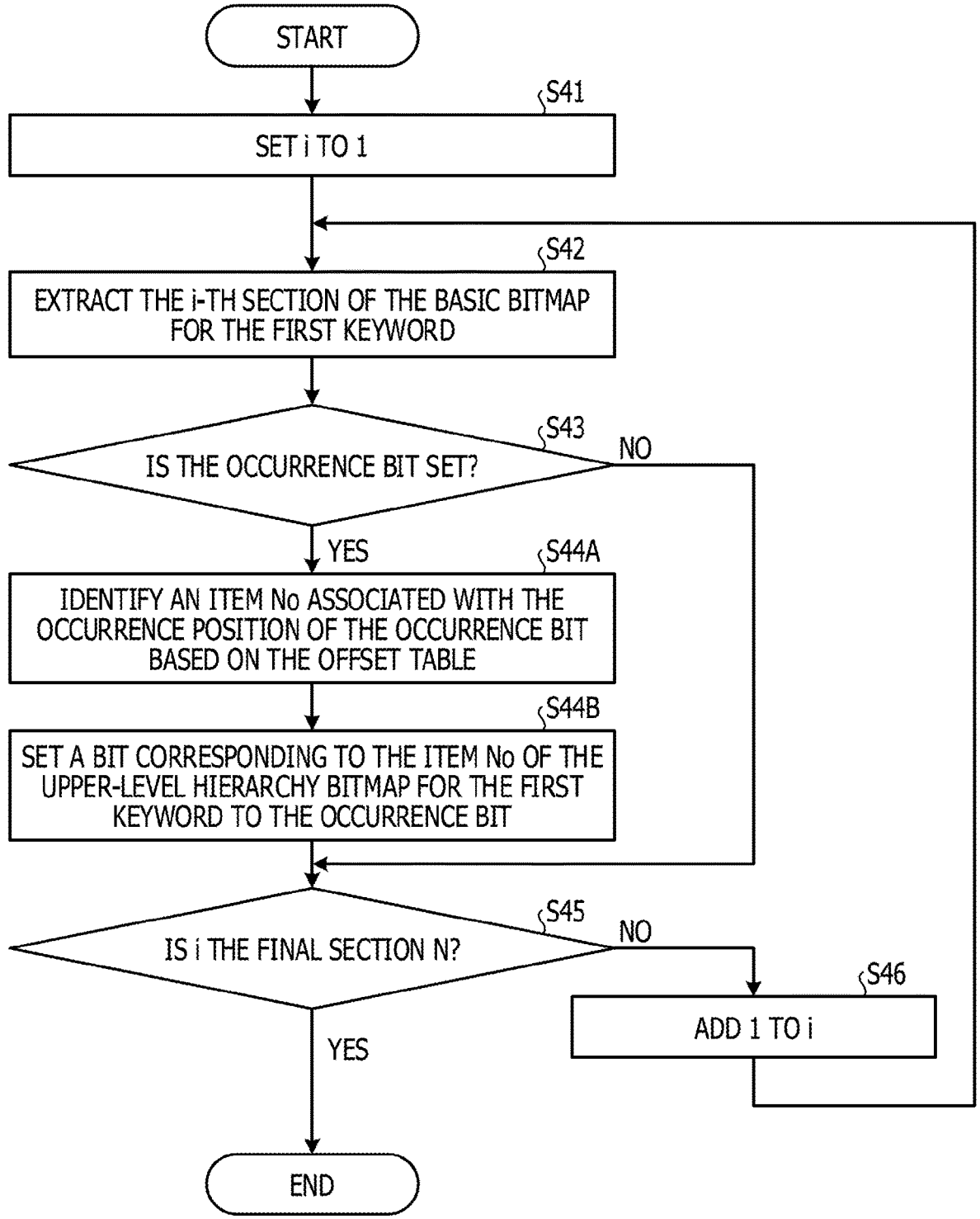
FIG. 16 is an example of the flowchart of upper-level hierarchy bitmap generation processing according to the second embodiment.

Processing Procedure of Upper-Level Hierarchy Bitmap Generation Processing According to Second Embodiment FIG. 16 is an example of the flowchart of upper-level hierarchy bitmap generation processing according to the second embodiment. In this regard, the same processing as that the processing of the flowchart of the upper-level hierarchy bitmap generation processing illustrated in FIG. 9 is given the same sign, and the description of the duplicated processing will be omitted. The first embodiment and the second embodiment differ in the point of S44A and S44B.

As illustrated in FIG. 16, the search unit 120 sets the index i to 1 (step S41). The search unit 120 extracts the i-th section in the basic bitmap for the first keyword from the bitmap type index 132 (step S42). The i-th section corresponds to, for example the i-th 64-bit section.

The search unit 120 determines whether or not any bit of the extracted i-th section is set to the occurrence bit (step S43). If the search unit 120 determines that all the bits are not set to the occurrence bit (step S43: No), the processing of the search unit 120 proceeds to step S45.

On the other hand, if the search unit 120 determines that any bit is set to the occurrence bit (step S43: Yes), the search unit 120 identifies an item No 201a associated with the occurrence position of the occurrence bit based on the offset table 201 (step S44A). The search unit 120 then sets a bit corresponding to the item No of the upper-level hierarchy bitmap for the first keyword to the occurrence bit (step S44B). That is to say, the search unit 120 sets the i-th section of the upper-level hierarchy bitmap for the first keyword. The processing of the search unit 120 then proceeds to step S45.

In step S45, the search unit 120 determines whether or not the index i is the final section N (step S45). If the search unit 120 determines that the index i is not the final section N (step S45: No), the search unit 120 adds 1to the index i (step S46). The processing of the search unit 120 then proceeds to step S42 in order to perform the processing for the next section.

On the other hand, if the search unit 120 determines that the index i is the final section N (step S45: Yes), the search unit 120 terminates the upper-level hierarchy bitmap generation processing.

In this regard, the index generation unit 113 extracts a basic bitmap corresponding to the word for each word output from the character or word acquisition unit 112 from the bitmap type index 132. The index generation unit 113 sets a bit corresponding to the occurrence position in the text data F1 in the extracted basic bitmap to the occurrence bit.

Advantages of Second Embodiment

In this manner, in the second embodiment, the search unit 120 generates second index information having a second axis which is superordinate to the first axis based on the contents including a separation unit of the original data for the encoded data. The search unit 120 then searches the encoded data in response to the search request using the second index information. With such a configuration, the search unit 120 generates first index information using the first axis and then dynamically generates second index information in accordance with a separation unit of the original data, such as a file, a block, an item, a sentence, or the like so that it is possible to reduce the amount of search calculation. In other words, the search unit 120 generates first index information and then dynamically generates second index information in accordance with the target granularity so that it is possible to reduce the amount of calculation for regenerating the first index information having the target granularity and the amount of calculation for searching for a word string or a character string having a low frequency of the occurrence bit.

In this regard, in the first embodiment and the second embodiment, a description has been given that the encoding unit 110 obtains the occurrence position for each word at the time of encoding the text data F1 and sets a bit corresponding to the obtained occurrence position of the basic bitmap of the bitmap type index 132 to the occurrence bit. Also, a description has been that when the search unit 120 receives a search query to the encoded data, the received search query is performed as follows. That is to say, the search unit 120 extracts a basic bitmap for the first keyword of the search query for each 64-bit section and generates an upper-level hierarchy bitmap by superordinating aggregating) the bit string for each of the extracted 64-bit sections into one bit. Further, a description has been given that the search unit 120 refers to the upper-level hierarchy bitmap, obtains an occurrence position corresponding to the occurrence bit, and makes a search query using the 64-bit section in the basic bitmap, which is a 64-bit section corresponding to the obtained occurrence position, as a search target. However, the encoding unit 110 may hash each basic bitmap of the bitmap type index 132 to generate a hashed index in order to reduce the size of the bitmap type index 132 (for example, in the X-axis direction). That is to say, in hashing processing, a hashed bitmap may be generated by hashing each basic bitmap for each 64-bit section based on hash values (bases), which are two adjacent prime numbers.

Figure 17:
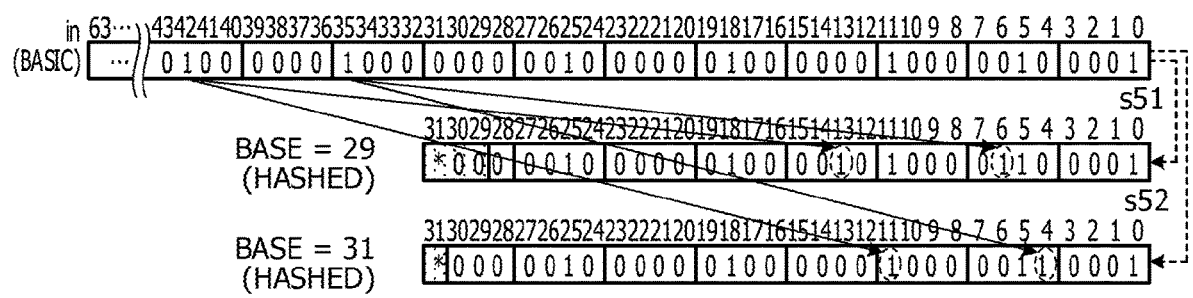
FIG. 17 is an explanatory diagram of hashing of a basic bitmap.

Here, a description will be given of hashing of the basic bitmap with reference to FIG. 17. FIG. 17 is an explanatory diagram illustrating hashing of a basic bitmap. As illustrated in FIG. 17, in the hashing processing, two hashed bitmaps are generated to which a hash function is applied for each 64-bit section of the basic bitmap of the word ID of a word. Here, in the hashing processing, a 64-bit register is assumed, and, for example, the basic bitmap is hashed based on the adjacent hash values (bases) of 29 and 31. Specifically, in the hashing processing, in order to generate a hashed bitmap of one base, the position of a remainder produced by dividing the position of each bit of the basic bitmap corresponding to the word ID by the base is set to each bit value of the basic bitmap. As an example, in the hashing processing, the position of a remainder produced by dividing the position of each bit of the basic bitmap for "in" by base 29 is set to each bit value of the basic bitmap for the hashed bitmap having base 29 (s51). The bit value "1" of the 35th bit position of the basic bitmap is transformed to the 6th bit of the hashed bitmap having base 29. The bit value "1" at the 42nd bit position of the basic bitmap is transformed to the 13th bit of the hashed bitmap having base 29. In the hashing processing, the position of a remainder produced by dividing the position of each bit of the basic bitmap for "in" by base 31 is set to each bit value of the basic bitmap for the hashed bitmap having base 31 (s52). The bit value "1" at the 35th bit position of the basic bitmap is transformed to the 4th bit of the hashed bitmap having base 31. The bit value "1" at the 42nd bit position of the basic bitmap is transformed to the 11th bit of the hashed bitmap having base 31. That is to say, in the hashing processing, each bit from the 0th bit of the basic bitmap is transformed to from the 0th bit to the (base−1)th bit of the hashed bitmap in sequence. In the hashing processing, by turning back one again from the 0th bit of the hashed bitmap, an OR operation is performed with the already set value in the hashed bitmap to produce a value of the transformation destination.

From such a hashed bitmap produced by hashing the basic bitmap, the search unit 120 ought to make a search query. That is to say, when the search unit 120 receives a search query to the encoded data, the search unit 120 restores the hashed bitmap for the first keyword of the search query for each section produced by hashing a 64-bit section. The search unit 120 generates an upper-level hierarchy bitmap by superordinating (aggregating) a bit string into one bit for each restored 64-bit section. Further, the search unit 120 refers to the upper-level hierarchy bitmap, obtains the occurrence position corresponding to the occurrence bit, and restores the hashed bitmap corresponding to the obtained occurrence position. The search unit 120 ought to make a search query using the restored 64-bit section as a search target.

Figure 18:
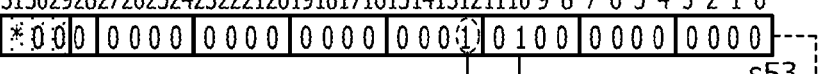
FIG. 18 is an explanatory diagram of restoration of a hashed basic bitmap.

Here, a description will be given of restoration of a hashed basic bitmap with reference to FIG. 18. FIG. 18 is an explanatory diagram illustrating restoration of a hashed basic bitmap. In this regard, a description will be given of the processing for restoring a hashed 64-bit section. As illustrated in FIG. 18, in the restoration processing, two hashed bitmaps are expanded into respective bitmaps (first restoration processing). Here, in the restoration processing, each bit value of the hashed bitmap is transformed to the position produced by adding the product of a base and an integer (0 or more) to the position of each bit of the hashed bitmap for restoration destination bitmap of a hashed bitmap having one base (s53 and s54). As an example, in the restoration processing, each bit value of the hashed bitmap having base 29 is transformed to the position produced by adding the product of base 29 and "0" to the position of each bit of the hashed bitmap for the restoration destination bitmap of the hashed bitmap having base 29. In the restoration processing, each bit value of the hashed bitmap having base 29 is transformed to the position produced by adding the product of base 29 and "1" to the position of each bit of the hashed bitmap for the restoration destination bitmap of the hashed bitmap having base 29. In the restoration processing, the processing is repeated until the position bit value of the maximum bit of the restoration destination bitmap having base 29 is set. In the restoration processing, the hashed bitmap having base 31 is also expanded into the restoration destination bitmap in the same manner. In the restoration processing, an AND operation between the bits of the positions corresponding to the two bitmaps restored in the first restoration processing (second restoration processing). Here, in the restoration processing, an AND operation is performed between the bitmap restored from the hashed bitmap having base 29 and the bitmap restored from the hashed bitmap having base 31 (s55). In the restoration processing, the bitmap of the AND result is output as a basic bitmap.

Another Mode Related to Embodiment

In the following, a description will be given of a part of variations in the embodiments described above. It is possible to make not only the following variations, but also suitable design changes without departing from the spirit and scope of the present disclosure.

Also, in the embodiments, the encoding device 100 generates a bitmap type index 123 of the basic bitmap having the occurrence position in the text data F1 as the first axis for each of the characters or the words obtained based on the lexical analysis of the text data F1. The encoding device 100 generates a bitmap type index 123 of the upper-level hierarchy bitmap which is superordinate to the first axis for each of the characters or the words. The encoding device 100 identifies a subarea to be a candidate target of the longest match search using the bitmap type index 123 of the upper-level hierarchy bitmap and performs encoding based on the longest match search in each subarea. However, the encoding device 100 may generate a hashed index produced by hashing the bitmap for each character and word in place of the bitmap type index 123 including the basic bitmap and the upper-level hierarchy bitmap that are generated for each of the characters or the words. The encoding device 100 then ought to restore the hashed index for the character or the word at the time of the longest match search, ought to identify a subarea to be the candidate target of the longest match search using the restored basic bitmap and upper-level hierarchy bitmap, and ought to perform encoding based on the longest match search in each subarea. Thereby, it is possible for the encoding device 100 to perform encoding with fewer resources at the time of encoding even if the available resources are few.

Also, for the information including the processing procedures, the control procedures, the specific names, various kinds of data, and the parameters that are described in the embodiments described above, it is possible to change in any way unless otherwise specified.

Hardware Configuration of Information Processing Apparatus

In the following, a description will be given of hardware and software used in the embodiments described above.

Figure 19:
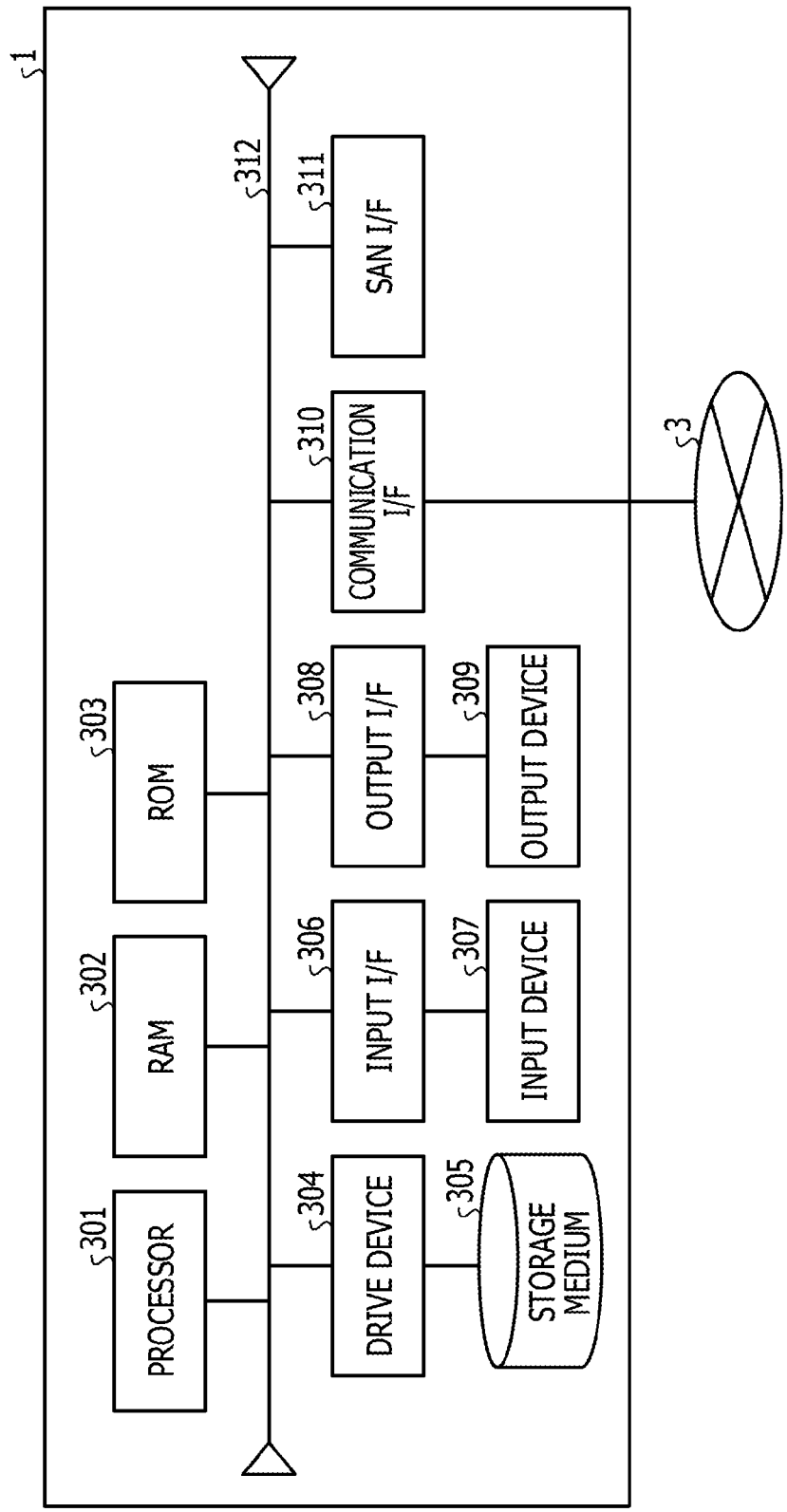
FIG. 19 is a diagram illustrating an example of the hardware configuration of a computer.

FIG. 19 is a diagram illustrating an example of the hardware configuration of a computer 1. The computer 1 includes, for example, a processor 301, a random access memory (RAM) 302, a read only memory (ROM) 303, a drive device 304, a storage medium 305, an input interface (I/F) 306, an input device 307, an output interface (I/F) 308, an output device 309, a communication interface (I/F) 310, a storage area network (SAN) interface (I/F) 311, a bus 312, and the like. Each piece of the hardware is coupled via a bus 312.

The RAM 302 is a readable and writable memory device, and a semiconductor memory, for example, a static RAM (SRAM), a dynamic RAM (DRAM), a flash memory, or the like is used for the RAM 302. The ROM 303 includes a programmable ROM (PROM), or the like. The drive device 304 is a device that reads information, writes information, or reads and writes information recorded in the storage medium 305. The storage medium 305 stores information written by the drive device 304. The storage medium 305 is a storage medium, for example, a hard disk, a flash memory, such as a solid state drive (SSD), or the like, a compact disc (CD), a digital versatile disc (DVD), a Blu-ray Disc, or the like. Also, for example, the computer 1 is provided with a drive device 304 and a storage medium 305 for each of a plurality of kinds of storage media.

The input interface 306 is coupled to the input device 307 and is a circuit that transfers an input signal received from the input device 307 to the processor 301. The output interface 308 is coupled to the output device 309 and is a circuit that causes the output device 309 to perform outputting in accordance with an instruction of the processor 301. The communication interface 310 is a circuit that performs communication control via a network 3. The communication interface 310 is, for example a network interface card (NIC), or the like. The SAN interface 311 is a circuit that performs communication control with a storage device coupled with the computer 1 via a storage area network. The SAN interface 311 is, for example a host bus adapter (HBA), or the like.

The input device 307 is a device that sends an input signal in accordance with operation. The input device 307 is, for example, a keyboard, a key device, such as a button attached to the main part of the computer 1, or the like, a pointing device, such as a mouse, a touch panel, or the like. The output device 309 is a device that outputs information under the control of the computer 1. The output device 309 is, for example, an image output device (display device), such as a display, or the like, an audio output device, such as a speaker, or the like. Also, an input and output device, for example, a touch screen, or the like is used for the input device 307 and the output device 309. Also, the input device 307 and the output device 309 may be integrated with the computer 1 or may not be included in the computer 1, for example, may be devices to be coupled to the computer 1 from the outside.

For example, the processor 301 reads a program stored in the ROM 303 or the storage medium 305 to the RAM 302 and performs the processing of the encoding unit 110 and the search unit 120 in accordance with the read program procedure. At that time, the RAM 302 is used as a work area of the processor 301. The functions of the storage unit 130 are realized by the program files (an application program 24, middleware 23 and an OS 22, and the like described later) and the data files (for example, the static dictionary 131, the bitmap type index 132, and the like) stored by the ROM 303 and the storage medium 305, and the RAM 302 is used as a work area of the processor 301. A description will be given of a program read by the processor 301 with reference to FIG. 20.

Figure 20:
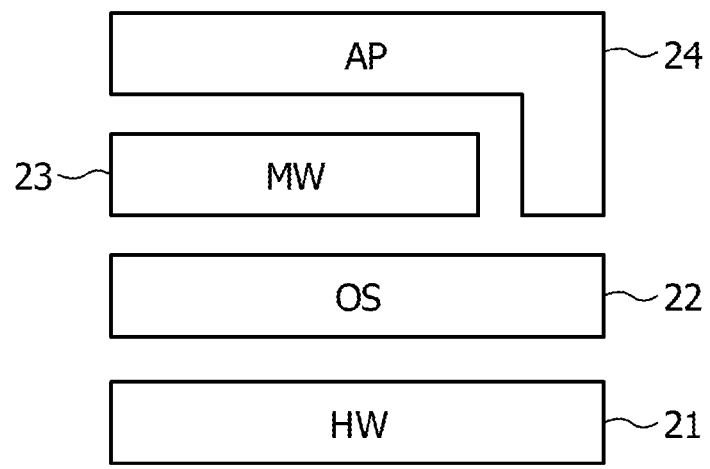
FIG. 20 is a diagram illustrating an example of the configuration of programs running on the computer.

FIG. 20 is a diagram illustrating an example of the configuration of programs running on the computer. In the computer 1, an operating system (OS) 22 that controls the hardware group (HW) 21 (301 to 312) illustrated in FIG. 19 operates. The processor 301 operates in the procedure in accordance with the OS 22 so as to control and manage the hardware group (HW) 21 in order for the hardware group 21 to perform processing in accordance with the application program (AP) 24 and the middleware (MW) 23. Further, the computer 1 reads the middleware (MW) 23 or the application program (AP) 24 to the RAM 302, and the processor 301 executes the middleware (MW) 23 or the application program (AP) 24.

When the encoding function is called, the functions of the encoding unit 110 and the search unit 120 are realized by the processor 301 that performs the processing of the middleware 23, the application program 24, or the combination thereof (performing the processing by controlling the hardware group 21 based on the OS 22). The encoding function and the search function may be included in the application program 24 itself, or may be a part of the middleware 23 to be executed in accordance with calling by the application program 24.

Figure 21:
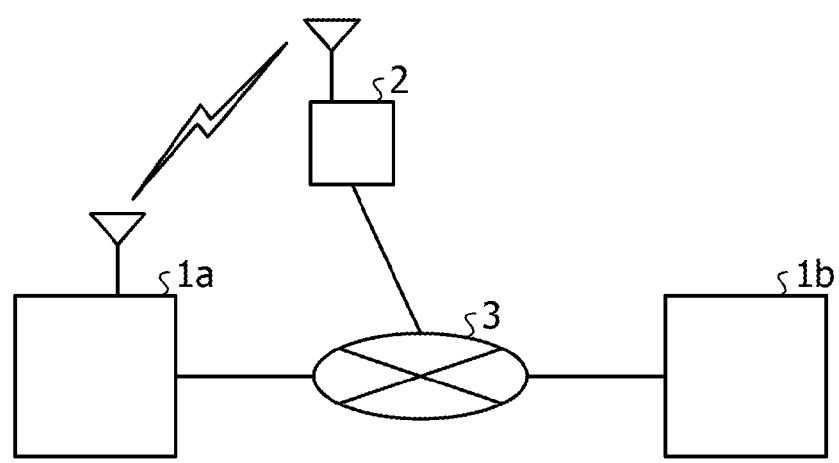
FIG. 21 is a diagram illustrating an example of the configuration of apparatuses in a system according to the embodiments.

FIG. 21 is a diagram illustrating an example of the configuration of apparatuses of a system according to the embodiments. The system in FIG. 21 includes a computer 1*a*, a computer 1*b*, a base station 2, and a network 3. The computer 1*a* is coupled to the network 3 to which the computer 1*b* is coupled via wireless communication, wired communication, or a combination thereof.

The encoding unit 110 and the search unit 120 illustrated in FIG. 6 may be included in either the computer 1*a* or the computer 1*b* illustrated in FIG. 21. The computer 1*b* may include the functions of the encoding unit 110, and the computer 1*a* may include the functions of the search unit 120. Alternatively, the computer 1*a* may include the functions of the encoding unit 110, and the computer 1*b* may include the functions of the search unit 120. Also, both the computer 1*a* and the computer 1*b* may include the functions of the encoding unit 110 and the functions of the search unit 120.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A search method executed by a computer, the search method comprising:
   receiving a search request to encoded text data;
   based on first index information produced by specifying an occurrence position of a character or a word included in original data of the encoded text data as a first axis and contents of the search request, generating second index information having a second axis superordinate to the first axis, the second axis including a plurality of items each indicating separation unit of original data of the encoded data, the second axis being an axis for aggregating a bit string for each of the plurality of items;
   acquiring an item from among the plurality of items based on the generated second index information; and
   searching the encoded text data in response to the search request using the acquired item,
   wherein the generating process includes:
      specifying, by using an offset information in which an offset position and the item are associated with each other, a first item associated with a first appearance bit indicating a first keyword among a bitmap of the first index information; and
      specifying, by setting a second appearance bit corresponding to the first item among the bitmap of the second index information, an area related to the first keyword among the bitmap of the second index information.

2. The search method according to claim 1, wherein the generating includes generating the second index information having a second axis superordinate to the first axis using the first index information for a first keyword included in the search request.

3. The search method according to claim 2, wherein the searching includes identifying an area including the first keyword in accordance with the second index information and determining whether there is a second keyword in the area in accordance with the first index information, the second keyword being included in the search request.

4. The search method according to claim 3, wherein the determining whether there is the second keyword in the area includes bit shifting a first bit string indicating an occurrence of the first keyword corresponding to the area among the first index information and performing an AND operation between the first bit string after the bit shifting and a second bit string indicating an occurrence of the second keyword corresponding to the area among the first index information.

5. The search method according to claim 1, wherein the second index information is generated by aggregating a bit string included in each item of the first index information into one bit.

6. The search method according to claim 1, wherein the generating includes generating the second index information by superordinating the first axis on the basis of contents included in a separation unit of character string included in the search request.

7. A search apparatus comprising:
   a memory; and
   a processor coupled to the memory and the processor configured to:
      receive a search request to encoded text data;
      execute, based on first index information produced by specifying an occurrence position of a character or a word included in original data of the encoded text data as a first axis and contents of the search request, a generation process of second index information having a second axis superordinate to the first axis, the first axis including a plurality of items each indicating separation unit of original data of the encoded data, the second axis being an axis for aggregating a bit string for each of the plurality of items;
      acquire an item from among the plurality of items based on the generated second index information; and
      execute a search of the encoded text data in response to the search request using the acquired item, wherein the generation process includes:
- specifying, by using an offset information in which an offset position and the item are associated with each other, a first item associated with a first appearance bit indicating a first keyword among a bitmap of the first index information; and
- specifying, by setting a second appearance bit corresponding to the first item among the bitmap of the second index information, an area related to the first keyword among the bitmap of the second index information.

8. The search apparatus according to claim 7, wherein the generation process includes generating the second index information having a second axis superordinate to the first axis using the first index information for a first keyword included in the search request.

9. The search apparatus according to claim 8, wherein the search includes identifying an area including the first keyword in accordance with the second index information and determining whether there is a second keyword in the area in accordance with the first index information, the second keyword being included in the search request.

10. The search apparatus according to claim 9, wherein the determining whether there is the second keyword in the area includes bit shifting a first bit string indicating an occurrence of the first keyword corresponding to the area among the first index information and performing an AND operation between the first bit string after the bit shifting and a second bit string indicating an occurrence of the second keyword corresponding to the area among the first index information.

11. The search apparatus according to claim 7,
wherein the processor is configured to generate the second index information by aggregating a bit string included in each item of the first index information into one bit.

12. The search apparatus according to claim 7, wherein the generation includes generating the second index information by superordinating the first axis on the basis of contents included in a separation unit of character string included in the search request.

13. A non-transitory computer-readable medium storing a search program that causes a computer to execute a process comprising:
- receiving a search request to encoded text data;
- based on first index information produced by specifying an occurrence position of a character or a word included in original data of the encoded text data as a first axis and contents of the search request, generating second index information having a second axis superordinate to the first axis, the first axis including a plurality of items each indicating separation unit of original data of the encoded data, the second axis being an axis for aggregating a bit string for each of the plurality of items;
- acquiring an item from among the plurality of items based on the generated second index information; and
- searching the encoded text data in response to the search request using the acquired item,
wherein the generating process includes:
- specifying, by using an offset information in which an offset position and the item are associated with each other, a first item associated with a first appearance bit indicating a first keyword among a bitmap of the first index information; and
- specifying, by setting a second appearance bit corresponding to the first item among the bitmap of the second index information, an area related to the first keyword among the bitmap of the second index information.

* * * * *